(12) United States Patent
Zhou

(10) Patent No.: US 11,981,113 B2
(45) Date of Patent: May 14, 2024

(54) FILM-STICKING BOX AND FILM-STICKING ASSEMBLY

(71) Applicant: Dongguan Pineapple Protection Co., Ltd., Dongguan (CN)

(72) Inventor: ShengJie Zhou, Dongguan (CN)

(73) Assignee: DONGGUAN PINEAPPLE PROTECTION CO., LTD., Dongguan (CN)

( * ) Notice: Subject to any disclaimer, the term of this patent is extended or adjusted under 35 U.S.C. 154(b) by 0 days.

(21) Appl. No.: 18/148,444

(22) Filed: Dec. 30, 2022

(65) Prior Publication Data

US 2023/0211591 A1    Jul. 6, 2023

(30) Foreign Application Priority Data

| Dec. 31, 2021 | (CN) | ......................... | 202111678835.9 |
| Sep. 21, 2022 | (CN) | ......................... | 202222523840.9 |
| Sep. 21, 2022 | (CN) | ......................... | 202222523884.1 |
| Dec. 21, 2022 | (CN) | ......................... | 202223437149.5 |
| Dec. 21, 2022 | (CN) | ......................... | 202223437428.1 |

(51) Int. Cl.
  *B32B 37/00* (2006.01)
  *B29C 65/00* (2006.01)
  *B29C 63/00* (2006.01)

(52) U.S. Cl.
  CPC ...... *B32B 37/0053* (2013.01); *B29C 63/0047* (2013.01); *B29C 66/342* (2013.01); *B29C 66/345* (2013.01); *B32B 37/003* (2013.01); *B32B 2457/20* (2013.01)

(58) Field of Classification Search
  CPC . B29C 66/342; B29C 66/345; B29C 63/0047; B29C 2063/0008; B32B 37/003; B32B 37/0046
  See application file for complete search history.

(56) References Cited

U.S. PATENT DOCUMENTS

2020/0290265 A1* 9/2020 Chen ...................... B29C 63/02
2022/0055362 A1* 2/2022 Liu ......................... B32B 37/10

FOREIGN PATENT DOCUMENTS

| CN | 212352894 U |   | 1/2021 |           |
| CN | 110920049 B | * | 3/2022 | ......... B29C 63/0004 |
| CN | 216375160 U |   | 4/2022 |           |
| KR | 101135144 B1 | * | 4/2012 |           |

* cited by examiner

*Primary Examiner* — Carson Gross
(74) *Attorney, Agent, or Firm* — Andrew C. Cheng

(57) ABSTRACT

A film-sticking box configured to attach a protective film to an electronic device is provided. The film-sticking box includes a main body and an inner casing. The inner casing accommodates the electronic device. A first opening and a second opening are respectively defined at two opposite ends of the main body. The first opening is configured to pass the protective film therethrough. The inner casing slides in or out via the second opening. When in use, the protective film will take away the dust on the surface of the electronic device to be filmed during pulling, and the user will not pull the drawing film and the inner casing via the same opening to cause dust residue, which can simplify the structure and operation steps to improve user experience.

20 Claims, 14 Drawing Sheets

FILM-STICKING BOX AND FILM-STICKING ASSEMBLY

CROSS-REFERENCE TO RELATED APPLICATIONS

This application claims priority to Chinese Patent Applications No. 202222523884.1, No. 202111678835.9, No. 202222523840.9, No. 202223437428.1 and No. 202223437149.5, disclosures of which are hereby incorporated by reference in their entireties.

TECHNICAL FIELD

The present disclosure generally relates to the field of electronic equipment accessories, in particular to a film-sticking box and a film-sticking assembly.

BACKGROUND

Electronic equipment film is a kind of cold laminating film that can be used to mount the surface of electronic equipment, screen and other tangible objects, which can be divided into adhesive film, electrostatic film, etc., according to the types thereof. The electronic equipment after film mounting can be renewed and bright, and can be waterproof, preventing dust from entering the keyboard, and screen, and protecting the screen.

When the existing film box is used, it is necessary to clean the screen of the electronic device first, then tear off the release layer of the protective film, and then use the film box to position and attach the protective film to the screen of the electronic device. As a result, the protective film may be pasted crookedly, or there may be a lot of bubbles and dust in the pasted protective film, which makes the user experience poor.

SUMMARY

According to various embodiments of the present disclosure, a film-sticking box and a film-sticking assembly are provided. The film-sticking assembly includes a main body and an inner casing configured to accommodate the electronic device. A first opening and a second opening are respectively defined at two opposite ends of the main body, and the protective film passes through the first opening. The inner casing slides in or out via the second opening.

Preferably, the main body includes a base and a pressing member. The second opening is defined at one end of the base. The pressing member is disposed at one end of the main body close to the second opening. The inner casing moves with respect to the base, and the pressing member abuts the surface to be filmed of the electronic device accommodated in the inner casing.

Preferably, the main body includes an upper cover configured to be covered on the base, the first opening is defined at one end of the base and/or one end of the upper cover away from the second opening, and the protective film at least partially passes through the first opening.

Preferably, a notch is defined at the upper cover close to the second opening, and the pressing member is disposed corresponding to the notch and exposed to the upper cover.

Preferably, the pressing member is disposed on the base or the upper cover.

Preferably, the orthographic projection of the pressing member on the bottom surface of the base does not overlap with the orthographic projection of the upper cover on the bottom surface of the base.

Preferably, when the upper cover is covered on the base, the distance between one side of the pressing member away from the base and the bottom surface of the base is greater than or equal to the distance between one side of the upper cover away from the base and the bottom surface of the base.

Preferably, one end of the upper cover is hinged to one end of the base, a convex edge is disposed at one end of the position where the upper cover is hinged to the base, the inner surface of the edge of the upper cover abuts the outer surface of the convex edge, and the pressing member is clamped with the convex edge of the base.

Preferably, the upper cover includes a clamping block located in the notch, and the pressing member is connected to the upper cover via the clamping block.

Preferably, an operating part is defined at the inner casing close to the second opening, and when the inner casing is located in the base, the operating part is at least partially exposed to the base.

Preferably, one or more fixing structures for fixing the protective film are provided at the top wall of the inner casing, and the fixing structures are disposed on the end of the inner casing close to the first opening and/or on two sides of the inner casing perpendicular to the end of the inner casing close to the first opening.

Preferably, one or more resilient members are disposed on the inner wall of the accommodating slot of the inner casing, and the resilient members are integrally formed with or detachably connected to the inner casing.

Preferably, the base is provided with a concave structure disposed close to the position where the upper cover is hinged to the base, and when the upper cover rotates to a preset angle with respect to the base, a portion of the outer wall of the upper cover abuts the inner wall of the concave structure.

Preferably, a support structure is disposed at the side wall of the base facing the upper cover, and/or a strengthening structure is disposed at the upper cover close to the pressing member.

Preferably, one or more positioning grooves that correspond to the fixing structures are defined at one side of the upper cover facing the base, and when the upper cover is covered on the base, the fixing structures are at least partially located in the positioning grooves.

Preferably, the pressing member has a roller structure, and the outer wall of the pressing member is made of a flexible material and/or the outer diameters of the middle portion and two ends of the pressing member are equal or unequal.

Preferably, the inner casing is provided with a guiding bump and/or a guiding rib in a moving direction of the inner casing with respect to the base.

Preferably, the inner casing defines an accommodating slot for accommodating the electronic device and a pickup slot communicated with the accommodating slot, and the pickup slot is defined between two sides of the guiding rib or the pickup slot is defined at the guiding bump.

According to various embodiments of the present disclosure, a film-sticking assembly is further provided. The film-sticking assembly includes a protective film and the above film-sticking assembly. The protective film includes a film body and a drawing film, and the film-sticking assembly includes a main body and an inner casing. Two openings are defined on the main body. The inner casing is at least partially moved out of the main body via one of the two openings along a second direction, and the other of the two openings is configured for the drawing film to pass through and be pulled along a first direction to separate the film body from the drawing film. The first direction is opposite to the second direction.

Preferably, the drawing film includes a release film and a drawing part connected to one end of the release film, the release film is attached to one side of the film body, and the drawing part is located at a side of the release film away from the film body.

Compared with the existing art, the film-sticking box and the film-sticking assembly of the present disclosure have the following beneficial effects.

The film-sticking box includes a main body and an inner casing configured to accommodate the electronic device. A first opening and a second opening are respectively defined at two opposite ends of the main body, and the protective film passes through the first opening. The inner casing slides in or out via the second opening. Since the protective film will take away the dust on the surface of the electronic device to be filmed during pulling, the user will not pull the drawing film and the inner casing via the same opening to cause dust residue. Further, since the drawing film and the inner casing are pulled from two opposite directions, the first opening, for the drawing film to pass through, disposed at the end where the pressing member is disposed is not needed, which can simplify the structure and operation steps to improve user experience.

The pressing member is exposed to the upper cover. After the upper cover is covered on the base, when the inner casing moves with respect to the base, the pressing member abuts the top wall of the inner casing, and the pressing member continuously squeezes the protective film to prevent air bubbles from appearing after the protective film is pasted to the electronic device. Compared with other film boxes in which the upper cover is covered on the pressing member, the thickness of the upper cover of the film-sticking box is reduced, and the overall thickness thereof is reduced, which is convenient for transportation and carrying. When the upper cover completely covers the base, the structure between the upper cover and the base can be stabilized.

The main body includes a base and a pressing member. The first opening is defined at one end of the base, and the pressing member is disposed at one end of the main body close to the second opening. The inner casing moves with respect to the base, and the pressing member abuts the surface to be filmed of the electronic device accommodated in the inner casing. The inner shell drives the electronic device to move while the pressing member abuts the surface to be filmed of the electronic device to reduce the generation of air bubbles in the main body of the protective film during the film-sticking process.

The main body further includes an upper cover covered on the base, the first opening is defined at one end of the base and/or one end of the upper cover away from the second opening, and the protective film at least partially passes through the first opening. It can be understood that when the upper cover is covered on the base, an accommodating space is formed between the upper cover and the base, such that the protective film to be pasted, the electronic device and the inner casing are accommodated in the accommodating space to realize dust-free film sticking.

Further, a notch is defined on the upper cover close to the second opening, and the pressing member is exposed to the upper cover, in which case the size of the roller is not limited by the space between the upper cover and the base. Compared with other film boxes, the thickness of the upper cover is reduced, and the overall thickness is reduced, which is convenient for transportation and carrying. The upper cover of the film-sticking box covers the base except for the notch that exposes the pressing member. When the upper cover is covered on the base, an accommodating space is formed between the upper cover and the base, such that the protective film to be pasted, the electronic device and the inner casing are accommodated in the accommodating space to realize dust-free film sticking.

The positions of the pressing member may be different, so as to adapt to more types of film products and improve the applicable range of the film-sticking box.

The operating part can provide a structure that can be easily pulled out when the user needs to remove the inner casing from the base, which is convenient to use.

One or more resilient members are provided on the inner wall of the accommodating slot defined by the inner casing for accommodating the electronic device. The resilient members may be integrally formed with or detachably connected to the inner casing. The arrangement of the resilient members can improve the adaptability of the electronic device accommodated in the inner casing, so as to be adapted to electronic devices of various sizes.

The positional relationship between the pressing member and the upper cover and/or the distance between one side of the pressing member and the upper cover away from the base and the bottom surface of the base are further defined, which ensures that the pressing member acts on the protective film without making the overall volume of the film-sticking box too large.

One end of the upper cover is hinged to one end of the base and is covered on the base. The upper cover completely covers or partially covers the base. The structure of the upper cover is used to improve the overall stability of the pressing member, such that users can have a better experience. The clamping block of the upper cover or the convex edge of the base can fix the pressing member. When the user pulls the inner casing, the pressing member abuts the protective film and squeezes the protective film to complete the film sticking.

The base is provided with a concave structure disposed close to the position where the upper cover is hinged to the base, and part of the outer wall of the upper cover abuts the inner wall of the concave structure, such that an accommodating space for supporting or clamping the electronic device is formed between the upper cover and the base.

A supporting structure for fixing the electronic device is provided, such that the film-sticking box can also be used as a mobile phone holder. The support openings at different positions may be configured to place the electronic device at different angles, which is convenient. Furthermore, in order to improve the strength of the upper cover, a strengthening structure may be provided on the upper cover close to the pressing member.

A positioning groove is provided. When pulling the inner casing, since the positioning groove has a certain depth, the fixing structure is accommodated in the positioning groove. Therefore, the positioning groove can limit the position of the fixing structure, which can prevent the protective film to be pasted from falling off or popping up from the fixing structure during pushing or pulling, thereby improving the stability thereof.

The guiding rib may guide the protective film to tilt downward, such that when the inner casing moves with respect to the pressing member, the protective film may pass through the bottom surface of the pressing member smoothly, preventing the end of the protective film and the pressing member from interfering with each other to affect the film-sticking efficiency. Meanwhile, during the film-sticking process, the guiding bevel may also be configured to guide and slide the pressing member to the surface of the electronic device to be filmed, such that air bubbles caused by direct contact between the protective film and the device to be filmed when the inner casing is pushed directly through the opening of the base may be prevented.

A guiding bump may also be provided. When the inner casing is fully pushed into the base, i. e., when the inner casing can no longer slide to the inside of the base, the pressing member always abuts the guiding bump. In this case, when the inner casing is taken out from the base after the film sticking is completed, the pressing member is directly removed from the guiding bump, which avoids that when the inner casing is removed from the base, the pressing member may also abut the side face of the guiding bump and increase the difficulty of removing the base, and that user may misuse to result in the inner casing being completely removed from the base to improve the user experience.

A pickup slot may also be provided, which is communicated with the accommodating slot. The pickup slot may be defined between the guiding ribs, or may also be defined at the guiding bump.

When using the film-sticking box to paste a protective film, the user pulls the protective film along the first direction to separate the release film from the film body, and then pulls the inner casing along the second direction, such that the pressing member can gradually press the film body to the surface of the electronic device to be filmed, and gradually discharge the air bubbles to improve the film-sticking effect.

The protective film includes a drawing film and a film body, the drawing film includes a release film and a drawing part connected to one end of the release film. When using the film-sticking box to paste a protective film, the user pulls the protective film along the first direction to separate the release film from the film body, and then pulls the inner casing along the second direction, such that the pressing member can gradually press the film body to the surface of the electronic device to be filmed, and gradually discharge the air bubbles to improve the film-sticking effect.

Figure 1:
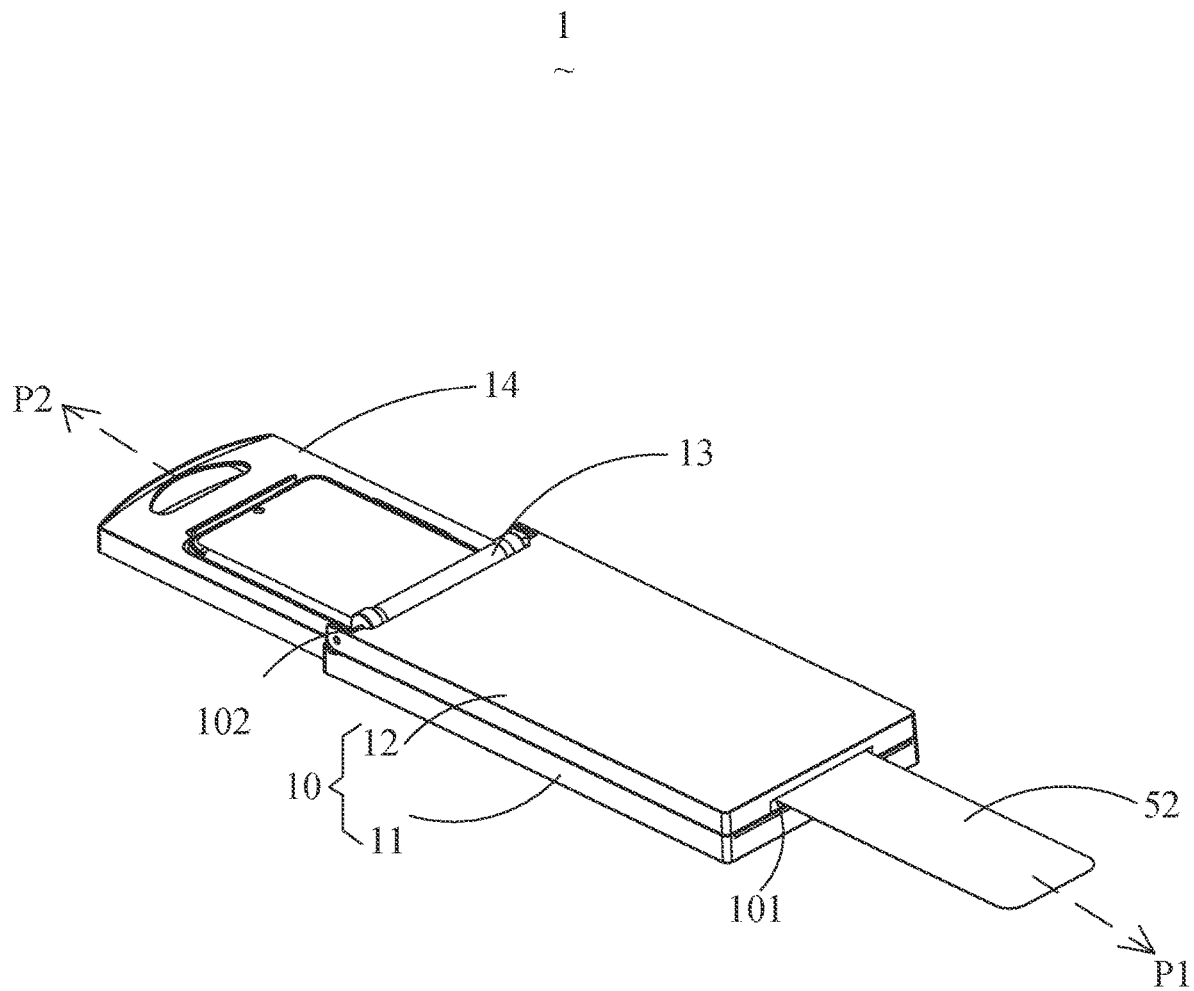
FIG. 1 is a perspective view of a film-sticking box according to some embodiments.

NUMERICAL REFERENCE IDENTIFICATION 1, film-sticking box; 2, film-sticking box; 3, film-sticking box; 5, protective film;
10, main body; 11, base; 12, upper cover; 13, pressing member; 14, inner casing; 16, slit; 19, pickup slot; 101, first opening; 102, second opening;
110, bottom surface; 111, convex edge; 112, concave structure; 120, notch; 121, matching block; 122, clamping block; 123, gap; 124, positioning groove; 131, clamping column; 133, axis; 141, fixing structure; 142, resilient member; 143, operating part; 144, accommodating slot; 150, guiding member; 170, guiding structure; 200, strengthening structure; 250, guiding rib; 290, guiding bump;
1411, first part; 1412, second part;
32, support structure; 321, support opening; 50, film body; 52, drawing part; 54, release film; 56, positioning structure; 59, drawing film.

DETAILED DESCRIPTION

In order to make the objectives, technical solutions, and advantages clearer, the present disclosure is further described in detail below with reference to the accompanying drawings and embodiments. It should be understood that the specific embodiments described herein are provided for illustration only, and not for the purpose of limiting the present disclosure.

It should be noted that, in the present disclosure, the terms "up", "down", "left", "right", "front", "rear", "top", "bottom", "inside", "outside", "middle", "vertical", "horizontal", "longitudinal", etc. are based on the orientations or positional relationships shown in the drawings. Terms herein are primarily used to better describe the present disclosure and the embodiments, and are not intended to limit that the indicated device, element, or component must have a particular orientation, or be constructed and operated in a particular orientation.

In addition, some of the above-mentioned terms may be used to express other meanings besides orientation or positional relationship. For example, the term "on" may also be used to express a certain attachment or connection relationship in some cases. For those skilled in the art, the specific meanings of the above terms in the present disclosure can be understood according to specific situations.

Furthermore, the terms "install", "dispose", "provide", "connect", "contact" should be construed broadly. For example, it may be a fixed connection, a detachable connection, or an integral structure; it may be a mechanical connection, or an electrical connection; it may be directly connected, or indirectly connected through an intermediary, or an internal communication between two devices, elements, or components. For those skilled in the art, the specific meanings of the above terms in the present disclosure can be understood according to specific situations.

Figure 2A:
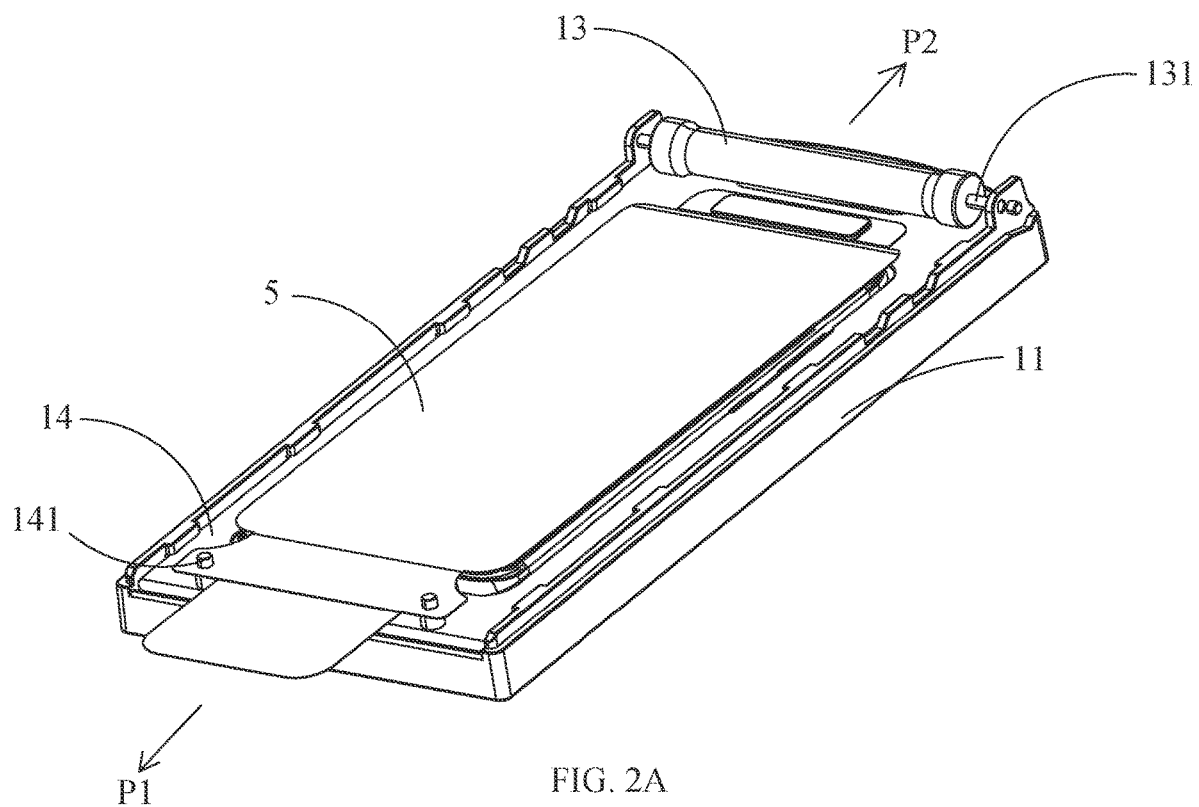
FIG. 2A is a schematic diagram of a drawing state of the film-sticking box in the first direction and the second direction according to some embodiments.

Referring to FIGS. 1 and 2A, a film-sticking assembly 1 configured to attach a protective film 5 to an electronic device is provided, according to certain embodiments. The film-sticking assembly 1 includes a main body 10 and an inner casing 14 configured to accommodate the electronic device. A first opening 101 and a second opening 102 are respectively defined at two opposite ends of the main body 10, and the protective film 5 passes through the first opening 101. The inner casing 14 slides in or out via the second opening 102.

In some embodiments, the protective film 5 may be pulled along the first direction P1. The inner casing 14 may be at least partially moved out of the main body 10 via the second opening 102 along the second direction P2. The first direction P1 is opposite to the second direction P2.

As shown in FIG. 1, the main body 10 may include a base 11 and an upper cover 12. The protective film 5 may be placed on the inner casing 14.

As shown in FIG. 2A, the inner casing 14 may be movably connected to the base 11 and be pulled out from or pushed into the base 11 via the second opening 102. When pulled out or pushed into, a pressing member 13 may be provided to abut the surface to be filmed of the electronic device accommodated in the inner casing 14.

The inner casing 14 may be connected to the base 11 by means of sliding, rail, translation or the like.

Referring to FIGS. 1 and 2A, the protective film 5 may be installed on the upper surface of the electronic device via a fixing structure 141. When the upper cover 12 is covered on the base 11, the pressing member 13 may abut the protective film 5. In this case, when the inner casing 14 is pulled out, the upper cover 12 and the inner casing 14 slide relatively, the pressing member 13 abuts the protective film 5, and the protective film 5 moves with the inner casing 14. During the movement of the protective film 5, the protective film 5 is continuously squeezed by the pressing member 13 to prevent air bubbles. Further, the pressing member 13 is exposed to the upper surface of the upper cover 12, in which case enlarging the size of the pressing part 13 will not increase the overall thickness of the film-sticking assembly 1. The pressing member 13 with a larger size may better squeeze the protective film 5 to achieve a relatively better film-sticking effect.

Figure 2B:
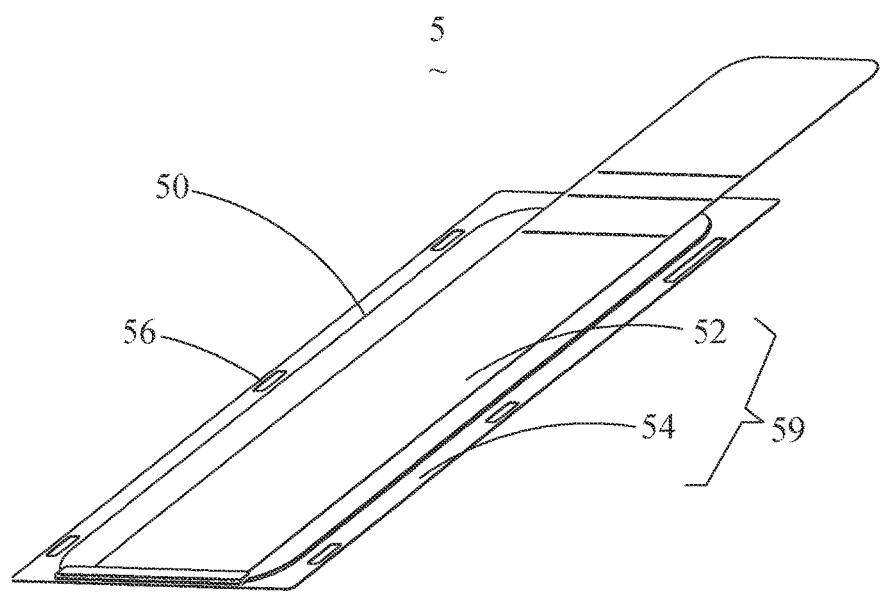
FIG. 2B is a perspective view of a protective film according to some embodiments.
Figure 2C:
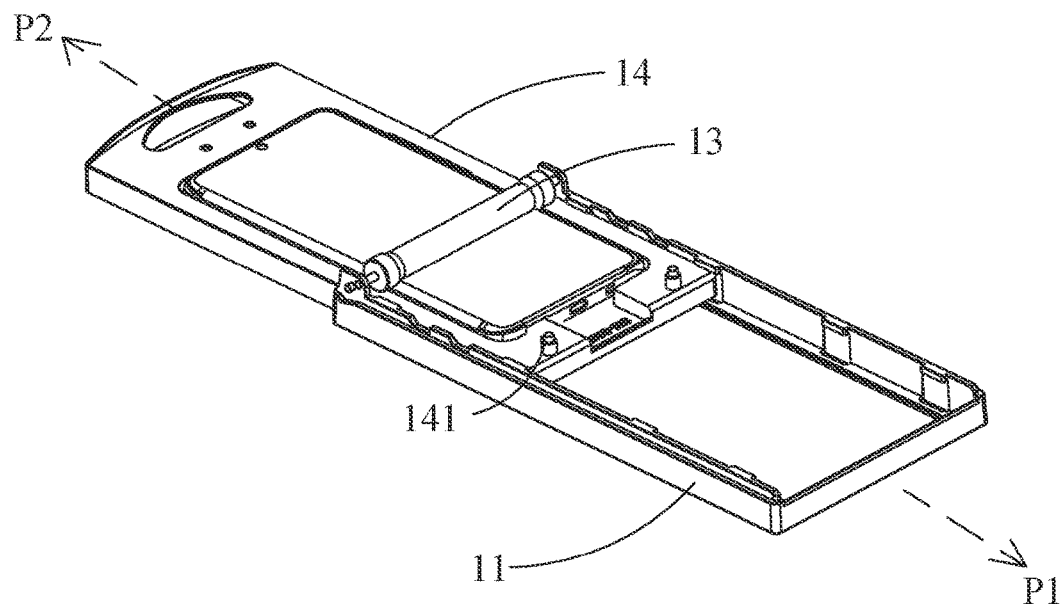
FIG. 2C is a schematic diagram of the film-sticking box and the protective film in which they may be pulled according to some embodiments.

Referring to FIGS. 2B-2C, the protective film 5 includes a film body 50 and a drawing film 59. The film body 50 corresponds to the surface of the electronic device to be filmed. The drawing film 59 may be pulled along the first direction P1, such that the film body 50 is gradually separated from the drawing film 59 and then attached to the surface of the electronic device to be filmed.

The drawing film 59 may include a release film 54 and a drawing part 52 connected to one end of the release film 54. The release film 54 may be attached to one side of the film body 50, and the drawing part 52 may be located on a side of the release film 54 away from the film body 50.

Referring to FIGS. 2A and 2C, the inner casing 14 may be provided with one or more fixing structures 141 configured to fix the protective film 5, which may facilitate positioning and stabilizing the protective film 5 and prevent the protective film 5 from sticking crookedly to affecting the film-sticking effect. Accordingly, the protective film 5 may be provided with one or more positioning structures 56 for cooperating with the fixing structures 141 when the protective film 5 is placed on the inner casing 14. The fixing structures 141 may be disposed at two opposite sides of the inner casing 14 in a direction parallel to the pulling direction of the inner casing 14 and/or a direction perpendicular to the pulling direction of the inner casing 14.

Figure 3:
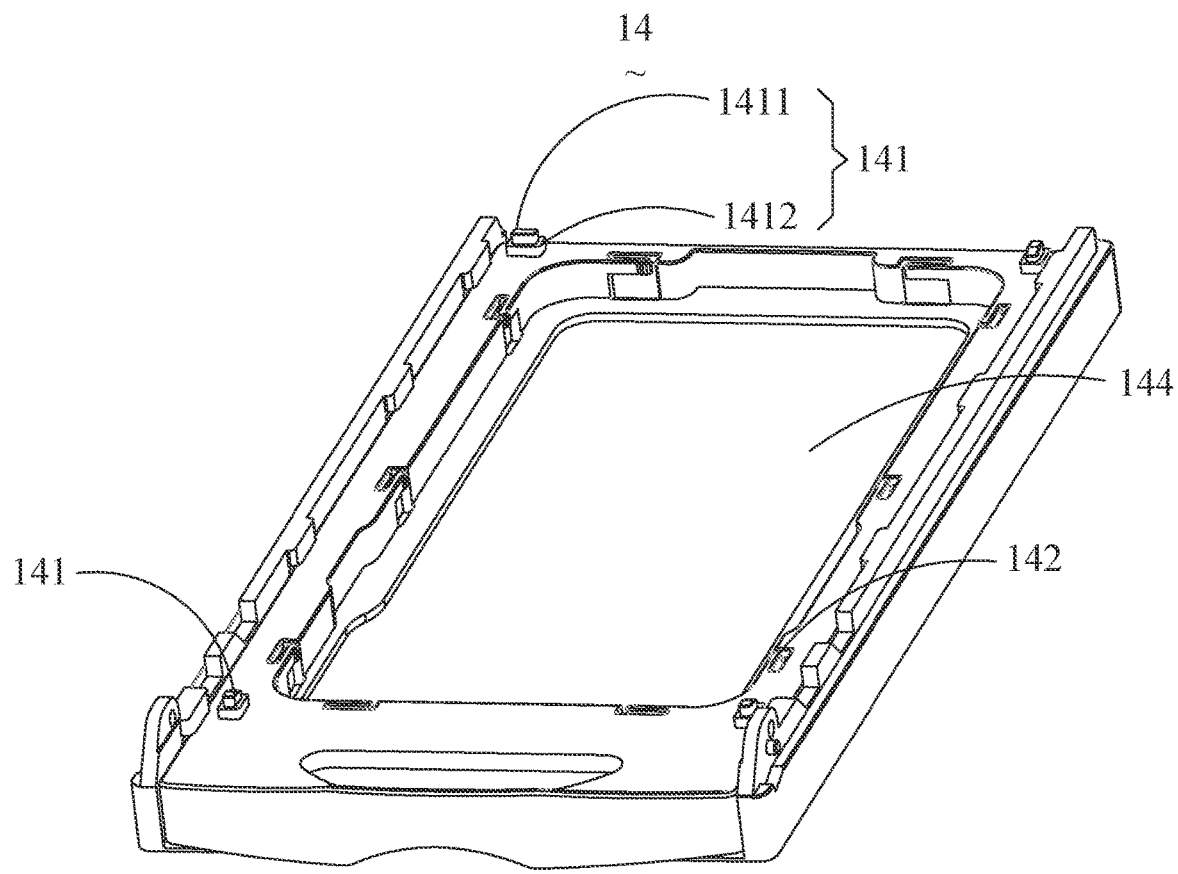
FIG. 3 is a structural schematic diagram of an inner casing accommodated in a base according to some embodiments.

In some embodiments, the fixing structure 141 may be configured as a protruding structure and the positioning structure 56 may be configured as a positioning hole. When the protective film 5 is placed on the inner casing 14, the protruding structure passes through the positioning hole to position and stabilize the protective film 5. Referring to FIG. 3, the protruding structure may include a first part 1411 disposed away from the inner casing 14 and a second part 1412 disposed close to the inner casing 14. The cross-sectional area of the first part 1411 is less than that of the second part 1412. After the protective film 5 is placed on the inner casing 14, the second part 1412 may support the protective film 5, while the first part 1411 may limit the position of the protective film 5 to prevent the protective film 5 from shaking or misaligning during sticking to avoid air bubbles and dust that may affect the film-sticking effect. The size of the positioning structure 56 is greater than the cross-sectional area of the first part 1411 and less than the cross-sectional area of the second part 1412, such that the positioning structure 56 may have a better fit with the protruding structure and the overall structure thereof is more stable.

Referring to FIG. 3, the upper surface of the inner casing 14 may define an accommodating slot 144 for placing the electronic device, and the fixing structures 141 may be located around the accommodating slot 144. After the protective film 5 is installed, the protective film 5 is in contact with and aligned with the screen of the electronic device.

The inner wall of the inner casing 14 may be provided with one or more resilient members 142 configured for adjusting the size of the accommodating slot 144. The resilient members 142 may provide some ductility when adapted to electronic devices of the same size but different models, such that the film-sticking box 1 may be adapted to different structures of different models of electronic devices to improve the applicability thereof.

As shown in FIGS. 2C and 3, the resilient members 142 may be disposed on the inner wall of the accommodating slot 144 or be integrally formed with the inner wall of the accommodating slot 144.

Figure 4A:
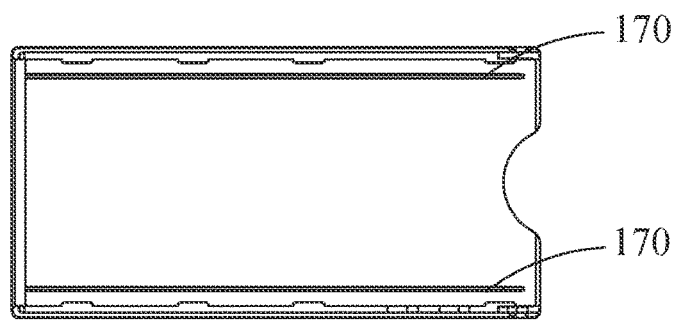
FIG. 4A is a top view of the base according to some embodiments.
Figure 4B:
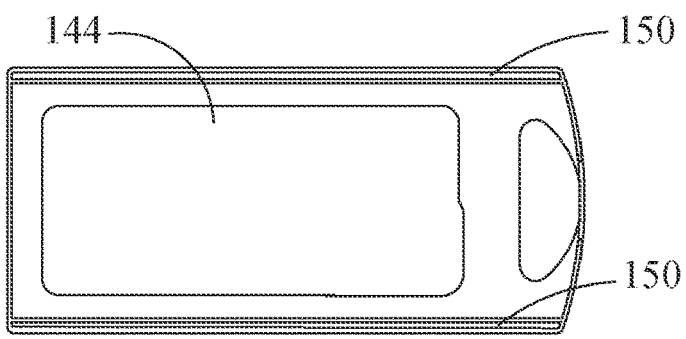
FIG. 4B is a bottom view of the inner casing according to some embodiments.

In some embodiments, as shown in FIGS. 4A-4B, a guiding member 150 may be provided on the bottom wall of the inner casing 14 opposite the top wall, i. e., on the opposite side of the bottom of the accommodating slot 144, and a guiding structure 170 may be correspondingly provided on the inner wall of the base 11 close to the inner shell to cooperate with the guiding member 150, such that the inner casing 14 may be movably connected to the base 11.

In some embodiments, the guiding member 150 may be a guiding slot and the guiding structure 170 may be a slider. In other embodiments, the guiding slot and slider may also be provided in a transposition, i. e., the slider may be disposed on the bottom wall of the inner casing 14 and the guiding slot may be provided on the inner wall or bottom wall of the base 11, such that the inner casing 14 may be slidably connected to the base 11.

Figure 5:
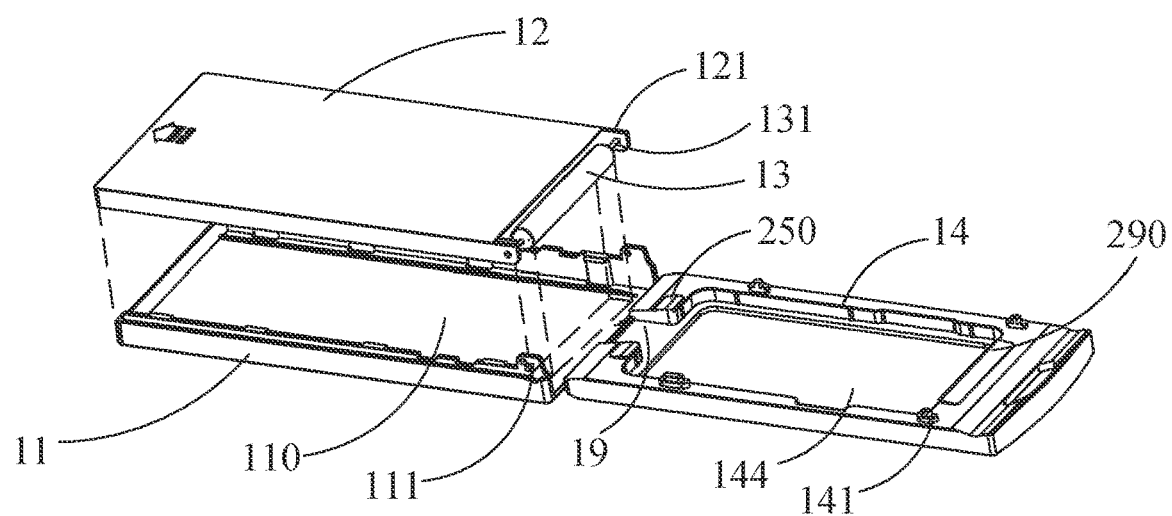
FIG. 5 is a schematic diagram of the film-sticking box in a separated configuration according to some embodiments.
Figure 6:
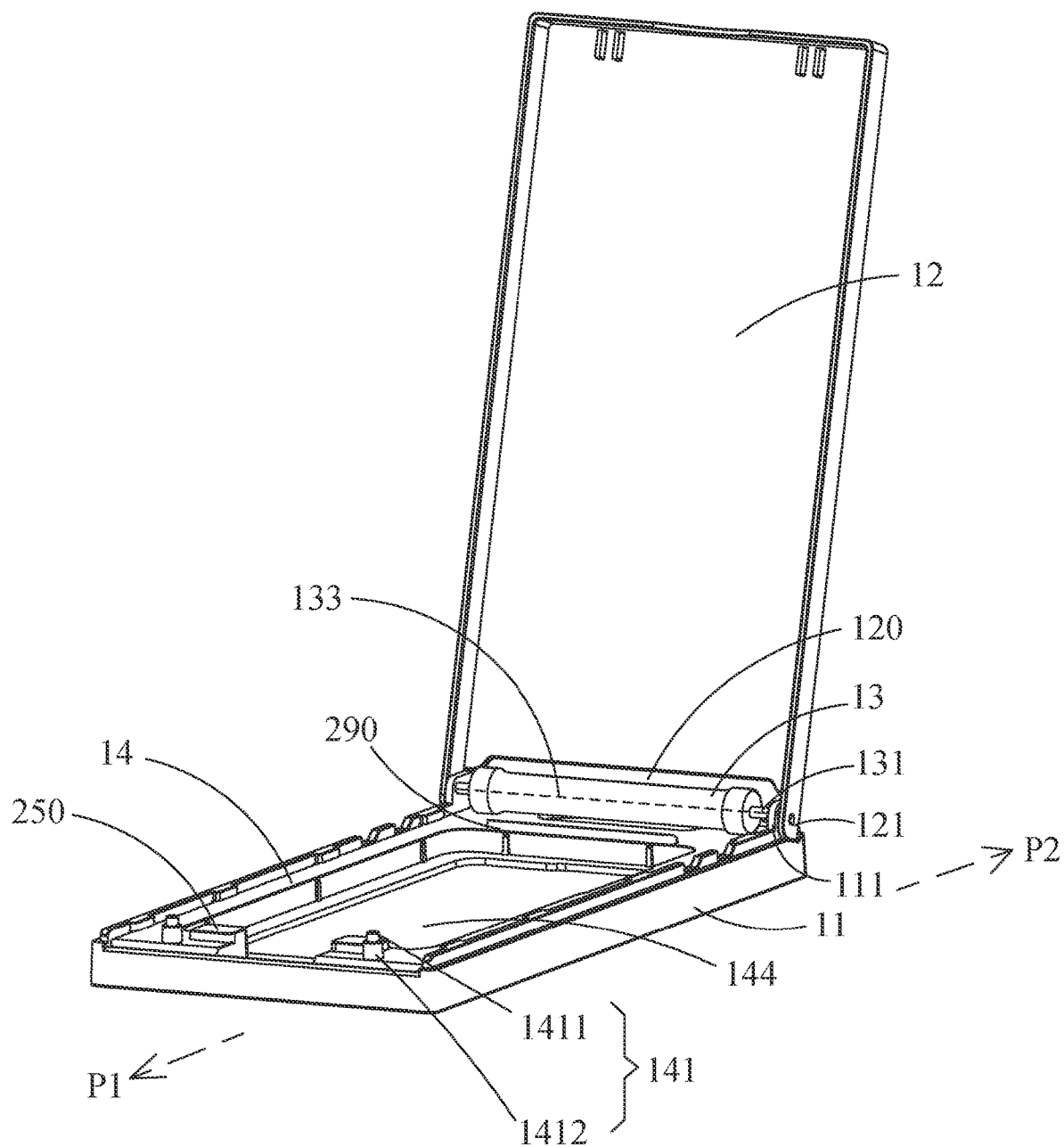
FIG. 6 is a perspective view of the film-sticking box in an open configuration according to some embodiments.

Referring to FIGS. 5-6, in some embodiments, the top wall of the inner casing 14 may be provided with a guiding rib 250, which is disposed between the fixing structure 141 and an edge of the slot wall of the accommodating slot 144. A guiding bevel may be provided on a side of the guiding rib 250 facing the pressing member 13.

The guiding rib 250 may guide the protective film 5 to tilt downward, such that when the inner casing 14 moves with respect to the pressing member 13, the protective film 5 may pass through the bottom surface of the pressing member 13 smoothly, preventing the end of the protective film and the pressing member 13 from interfering with each other to affect the film-sticking efficiency. Meanwhile, during the film-sticking process, the guiding bevel may also be configured to guide and slide the pressing member 13 to the surface of the electronic device to be filmed, such that air bubbles caused by direct contact between the protective film and the device to be filmed when the inner casing 14 is pushed directly through the opening (equivalent to the second opening 102) of the base 11 may be prevented.

The inner casing 14 may also be provided with a guiding bump 290, which is disposed between an edge of the accommodating slot 144 and the fixing structure 141 at the rear end of the inner casing 14 in the sliding-in direction of the inner casing 14. The guiding bump 290 and the guiding rib 250 may be respectively located on two opposite sides of the accommodating slot 144.

In some embodiments, as shown in FIGS. 5-6, when the inner casing 14 is fully pushed into the base 11, i. e., when the inner casing 14 can no longer slide to the inside of base 11, the pressing member 13 always abuts the guiding bump 290. In this case, when the inner casing 14 is taken out from the base 11 after the film sticking is completed, the pressing member 13 is directly removed from the guiding bump 290, which avoids that when the inner casing 14 is removed from the base 11, the pressing member 13 may also abut the side face of the guiding bump 290 and increase the difficulty of removing the base 11, and that user may misuse to result in the inner casing 14 being completely removed from the base 11 to improve the user experience.

In some embodiments, the guiding bump 290 may not be provided. The accommodating slot 144 of the inner casing 14 may be configured as a little deeper, i. e., the depth of the accommodating slot 144 of the inner casing 14 close to the front end of the sliding-in direction of the inner casing 14 may be less than the depth of the accommodating slot 144 of the inner casing 14 close to the rear end of the sliding-in direction of the inner casing 14, such that the pressure between the pressing member 13 and the electronic device to be filmed may also be adjusted.

Referring to FIG. 5, in some embodiments, the inner casing 14 may also include a pickup slot 19 communicated with the accommodating slot 144. The pickup slot 19 may be defined between the guiding ribs 250, or may also be defined at the guiding bump 290 to facilitate the removal of the electronic device from the accommodating slot 144. In other embodiments, the pickup slot 19 may also be defined on two sides of the guiding ribs 250 or the guiding bump 290, such that the electronic device may be taken out from the accommodating slot 144 more conveniently and the pickup slot 19 will not affect the pulling of the protective film 5.

Referring to FIGS. 5-6, in some embodiments, the plane where the bottom surface 110 of the base 11 is located is defined as a reference plane. The orthographic projections of the pressing member 13 and the upper cover 12 on the bottom surface 110 of the base 11 do not overlap.

The upper cover 11 may define a notch 120 close to the second opening 102, i. e., the orthographic projections of the pressing member 13 and the upper cover 12 on the bottom surface 110 of the base 11 do not overlap, such that the pressing member 13 may be completely exposed beyond the coverage of the upper cover 12 via the notch 120 of the upper cover 12, and the maximum height of the pressing member 13 is the maximum height of the film-sticking box 1. In other words, the upper cover 12 may be directly or indirectly connected to the pressing member 13. If the upper cover 12 is directly connected to the pressing member 13, the upper cover 12 acts directly on the pressing member 13; and if the upper cover 12 is indirectly connected to the pressing member 13, the upper cover 12 acts indirectly on the pressing member 13. Since the pressing member 13 is exposed to the upper cover 12, the upper cover 12 does not have any limitation on the size and material of the pressing member 13, which may improve the overall applicability of the film-sticking box 1.

When the upper cover 12 is covered on the base 11, a slit 16 may be defined between the end of the upper cover 12 away from the pressing member 13 and the base 11 for the drawing part 52 to pass through. The slit 16 may also be defined on the upper cover and/or the base.

By pulling the drawing part 52, the release film 54 may be separated from the film body 50, such that the user may perform subsequent operations. The protective film 5 may also include a dustproof film, which is attached on the side of the film body 50 away from the release film 54, and may be torn off after the film body 50 is pasted to the electronic device. The release film 54 may not provide the drawing part 52, in which case the film-sticking box 1 may also not define the slit 16.

As shown in FIG. 6, during the film-sticking process, after the protective film 5 is placed on the inner casing 14 and the upper cover 12 is covered on the base 11, the user may first pull the drawing part 52 of the protective film 5 along the first direction P1 to separate the release film 54 from the film body 50 via the slit 16 such that the film body 50 is located on the electronic device to be filmed. The user may then pull the inner casing 14 in which the electronic device to be filmed is accommodated along the second direction P2, such that the pressing member 13 may gradually press the film body 50 on the surface of the electronic device to be filmed to discharge air bubbles.

The upper cover 12 may completely or partially cover the base 11. If the upper cover 12 completely covers the base 11, after the upper cover 12 is covered on the base 11, the position of the base 11 corresponding to the notch 120 of the upper cover 12 is exposed, and the other areas are located within the orthographic projection area of the upper cover 12 on the bottom surface of the base 11. In other words, when the upper cover 12 is covered on the base 11, a space, in which the protective film, the electronic device and the inner casing are accommodated, is formed between the upper cover 12 and the base 11 to achieve a dust-free film sticking. One end of the upper cover 12 is hinged to the base 11 to form a connection with the base 11, such that a fixed force is formed between the upper cover 12 and the base 11 along the pushing or pulling direction of the inner casing 14 and the upper cover 12 may more stably act on the pressing member 13 during the pushing and pulling process of the inner casing 14.

In some embodiments, the end of the upper cover 12 opposite to the hinged end and the two sides adjacent to the end may form a connection relationship with the base 11, such that the fixed force in multiple directions is formed between the upper cover 12 and the base 11 and the upper cover 12 may more stably act on the pressing member 13 during the pushing and pulling process of the inner casing 14.

As shown in FIG. 6, the connection between the upper cover 12 and the base 11 may be: at least two sides of the base 11 are provided with convex edges 111, and the inner surface of the edge of the upper cover 12 abuts the outer surface of the convex edges 111; or in some other embodiments, the upper cover 12 wraps around the outer surface of the side edges of the base 11.

The upper cover 12 may also partially cover the base 11, with the upper cover 12 covering the base 11 near the notch 120 and the rest of the base 11 being open. The upper cover 12 partially covering the base 11 may effectively reduce the weight of the film-sticking box 1 while ensuring the stability of the pressing member 13, making it easier to carry and transport. In some embodiments, the upper cover 12 may also be configured as a cross structure, such that even if the upper cover 12 partially covers the base 11, the upper cover 12 may still cooperate with the base 11 to improve the stability of the upper cover 12. The upper cover 12 may also be configured as other hollow structures, which is not limited herein.

It should be noted that the upper cover 12 may be rotated and opened along the long side of the film-sticking box 1 for conveniently viewing of the interior of the film-sticking box 1.

In some embodiments, if the upper cover 12 is indirectly connected to the pressing member 13, the upper cover 12 may act indirectly on the pressing member 13. Two ends of the pressing member 13 are clamped to the base 11, and the end of the pressing member 13 toward the base 11 may be provided with a clamping column 131, and the convex edge may be formed by extending the hinge of the base 11 and the upper cover 12 toward the upper cover 12. The pressing member 13 may be clamped to the convex edge 111 of the base 11 by means of the clamping column 131. It should be noted that the clamping column 131 may also be provided inside the pressing member 13, with the clamping column 131 running through the pressing member 13 and two ends of the clamping column 131 protruding from two ends of the pressing member 13. The pressing member 13 and the clamping column 131 may be integrally formed or detachably connected. Specifically, the pressing member 13 may pass through the clamping column 131 by means of an axial through-hole formed on the pressing member 13. Or the clamping columns 131 may be disposed at two ends of the pressing member 13.

After the base 11 is clamped to two ends of the pressing member 13, the pressing member 13 will be fixed and will not move. When the user pulls the inner casing 14, the pressing member 13 abuts and squeezes the protective film 5 to complete the film sticking. Specifically, a matching block 121 may be provided at the hinge position between the upper cover 12 and the base 11, and the upper cover 12 may be connected to the convex edge 111 of the base 11 through the matching block 121 to realize the hinge connection between the upper cover 12 and the base 11.

As shown in FIG. 6, the hinge position of the upper cover 12 and the base 11 and the clamping position of the clamping column 131 and the base 11 may all be located at the convex edge 111. In other embodiments, the above-mentioned hinge position and clamping position may not be located at the same position, which are determined based on the structure of the film-sticking box 1. If the hinge position is located at the same position as the clamping position, the clamping column 131 passes through the base 11 and the matching block 121 such that the pressing member 13 may be connected to the base 11 and the upper cover 12 simultaneously. The upper cover 12 may act on the pressing member 13 to simplify the fixing structure of the film-sticking box 1, improve the stability of the connecting structure and reduce the assembly steps. No matter what the method is, the arrangement of the upper cover 12 is to better fix the pressing member 13 and prevent the pressing member 13 from shifting.

The outer diameters of the middle portion and two ends of the pressing member 13 may be equal or unequal. Referring to FIG. 6, the pressing member 13 may be a cylindrical roller, which has better contact with the protective film 5 than the pressing member 13 with other shapes and will not damage the protective film 5.

The pressing member 13 may also be cylindrical, or a roller structure with a small outer diameter in the middle and larger outer diameters at two ends, which may be configured to attach a protective film to electronic devices with curved screens.

When the inner casing 14 is pulled out from or pushed into the base 11 via the notch 120, the pressing member 13 and the inner casing 14 will relatively rotate, i. e., the pressing member 13 will rotate around its own axis 133, which may effectively prevent the protective film 5 from being damaged due to excessive pressing while ensuring the pressing effect.

The outer wall of the pressing member 13 is made of a flexible material, which may make the pressing member 13 be in flexibly contact with the protective film 5 and prevent the pressing member 13 from exerting too much pressure on the protective film 5 when sticking to damage the protective film 5.

The material of the outer wall of the pressing member 13 may also be silica gel, rubber, etc., which is not limited herein, as long as the pressing member 13 may be configured to squeeze the protective film 5.

Figure 7A:
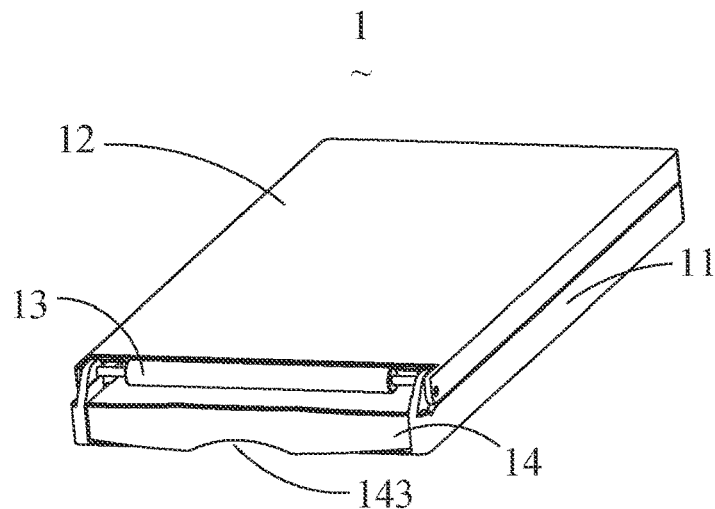
FIG. 7A is a perspective view of the pressing member exposed to the upper cover and the operating part configured as a notch in the film-sticking box according to some embodiments.
Figure 7B:
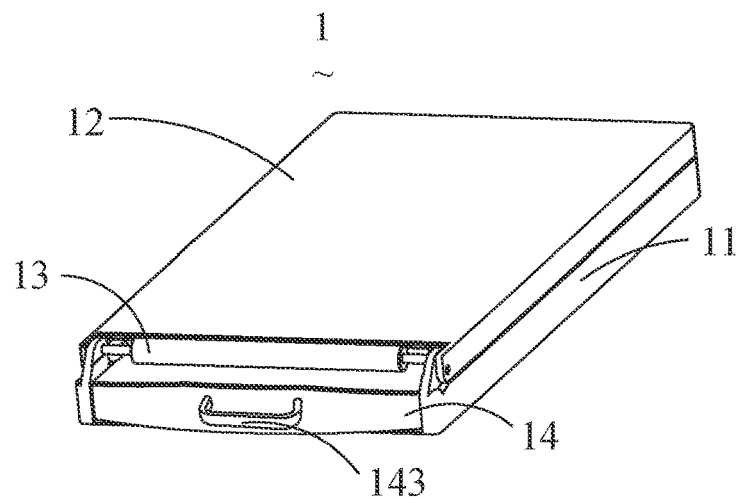
FIG. 7B is another perspective view of the operating part shown in FIG. 7A according to some embodiments.
Figure 7C:
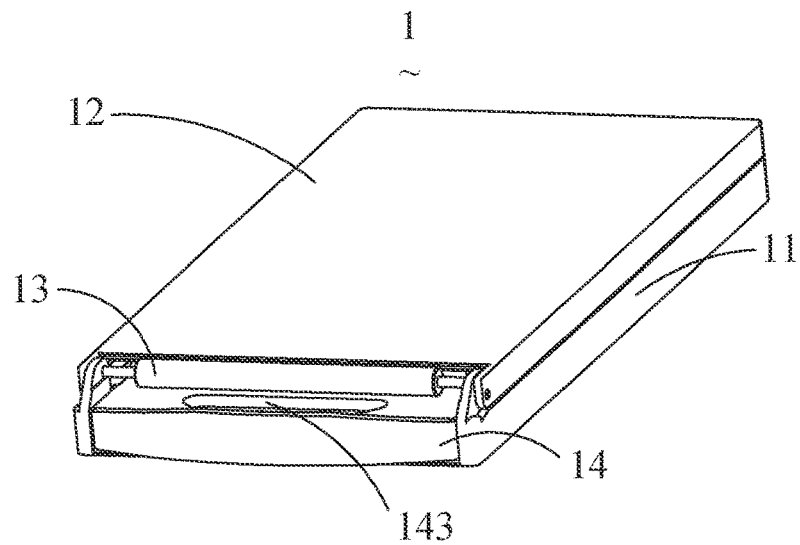
FIG. 7C is another perspective view of the operating part shown in FIG. 7A according to some embodiments.

Referring to FIGS. 7A-7C, the inner casing 14 may be provided with an operating part 143 close to the second opening 102 to facilitate the user to pull the inner casing 14 out of the base 11. In some embodiments, when the inner casing 14 is located in the base 11, the operating part 143 is at least partially exposed to the base 11. As shown in FIG. 7A, in some embodiments, the operating part 143 may be a groove defined on the outer wall of the inner casing 14. Optionally, as shown in FIG. 7B, the operating part 143 may also include a stretching part exposed to the base 11 and configured as an exposed handle. Optionally, as shown in FIG. 7C, the operating part 143 may also include a hollow structure formed at one end of the inner casing 14 close to the pressing member 13. The operating part 143 may facilitate the user to pull out the inner casing 14, which is convenient to use. It should be noted that the operating part 143 may include one or more structures as described above.

Figure 8:
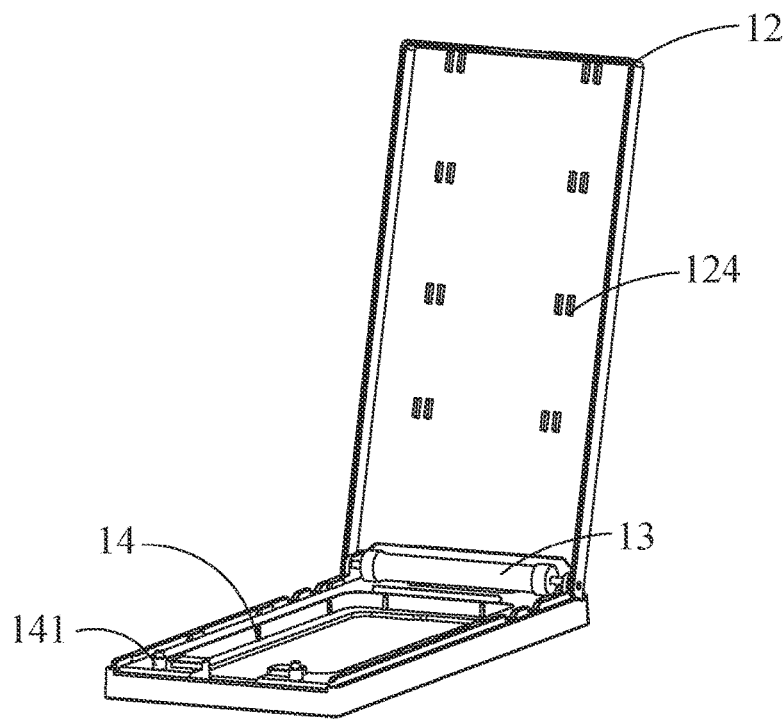
FIG. 8 is a perspective view of the film-sticking box in an open configuration according to some embodiments.
Figure 10:
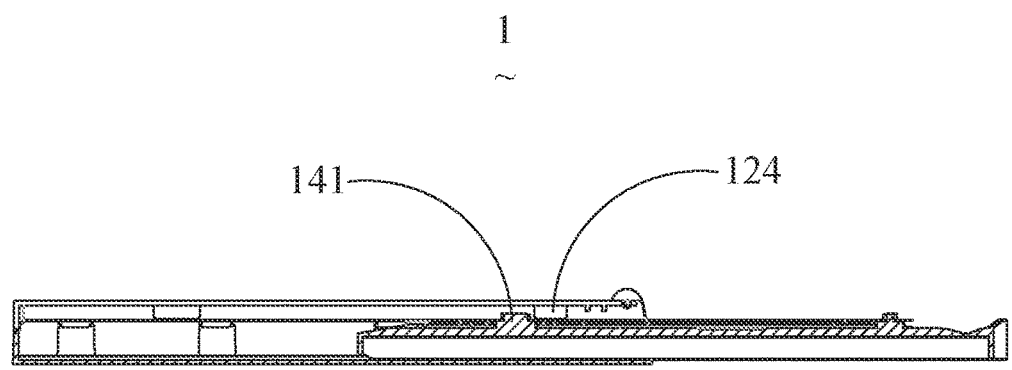
FIG. 10 is a schematic cross-sectional view of the film-sticking box along the direction A-A when the inner casing shown in FIG. 9 is pulled out according to some embodiments.

Referring to FIGS. 8 and 10, in other embodiments, the inner surface of the upper cover 12 may define one or more positioning grooves 124 that match the fixing structures 141. When the upper cover 12 is covered on the base 11, the fixing structures 141 are at least partially located in the positioning grooves 124. When the inner casing 14 is pulled, the fixing structures 141 are partially accommodated in the positioning grooves 124 having a certain depth to limit the positions of the fixing structures 141, such that the stability thereof may be improved.

Figure 9:
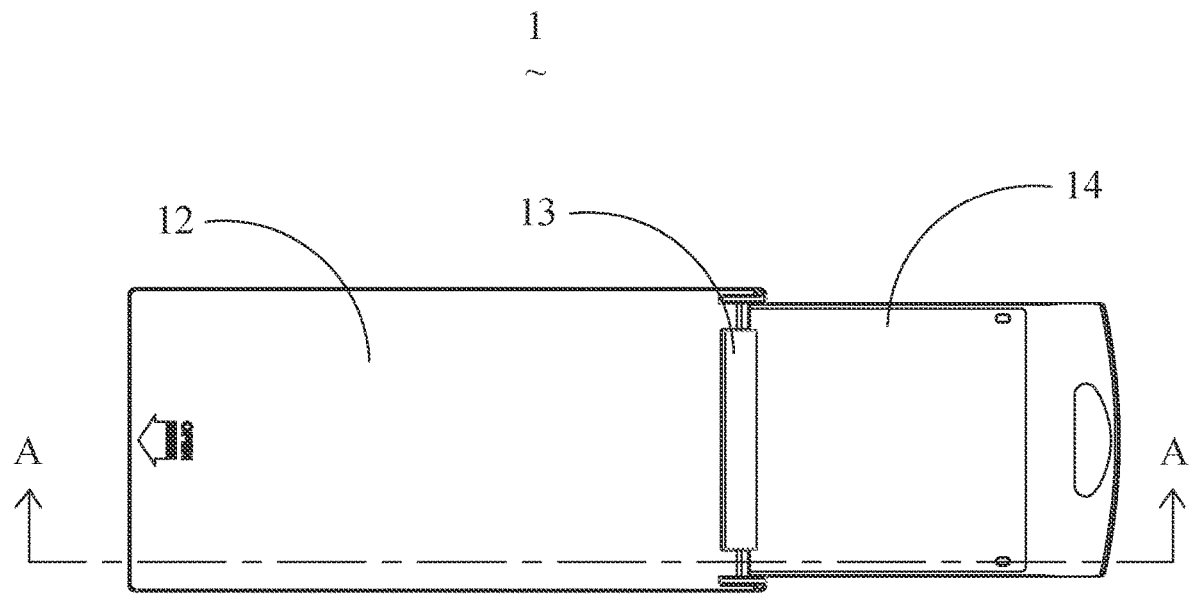
FIG. 9 is a structural schematic diagram of the top view of the film-sticking box when the inner casing is pulled out according to some embodiments.
Figure 11:
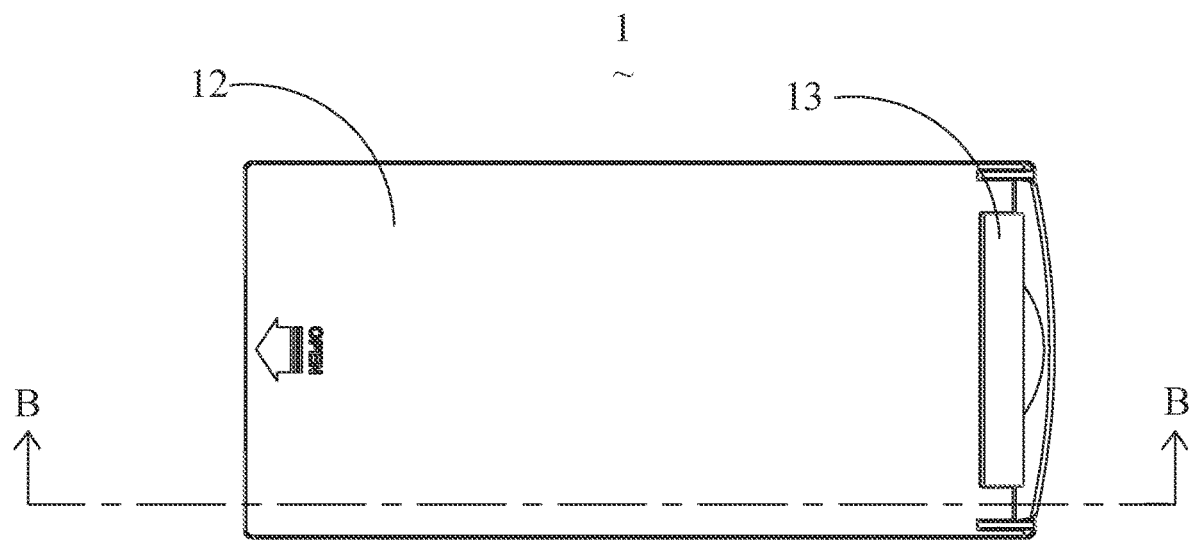
FIG. 11 is a structural schematic diagram of the top view of the film-sticking box when the inner casing is not pulled out according to some embodiments.
Figure 12:
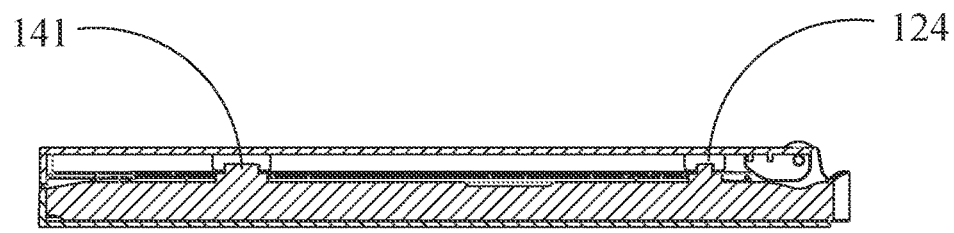
FIG. 12 is a schematic cross-sectional view of the film-sticking box shown in FIG. 11 along the B-B direction according to some embodiments.

Referring to FIGS. 9-12, in which FIG. 10 is a schematic cross-sectional view along the A-A direction shown in FIG. 9 and FIG. 12 is a schematic cross-sectional view along the B-B direction shown in FIG. 11, the positioning grooves 124 may be arranged as multiple separate grooves, or can be arranged as a continuous groove, and the centers of the positioning grooves 124 are arranged in a straight line. In this case, the fixing structure 141 will always be located within the center line range of the multiple positioning grooves 124 when the inner casing 14 is pulled or pushed relative to the upper cover 12 and the base 11, and the protective film to be pasted will not be horizontally displaced.

Figure 13:
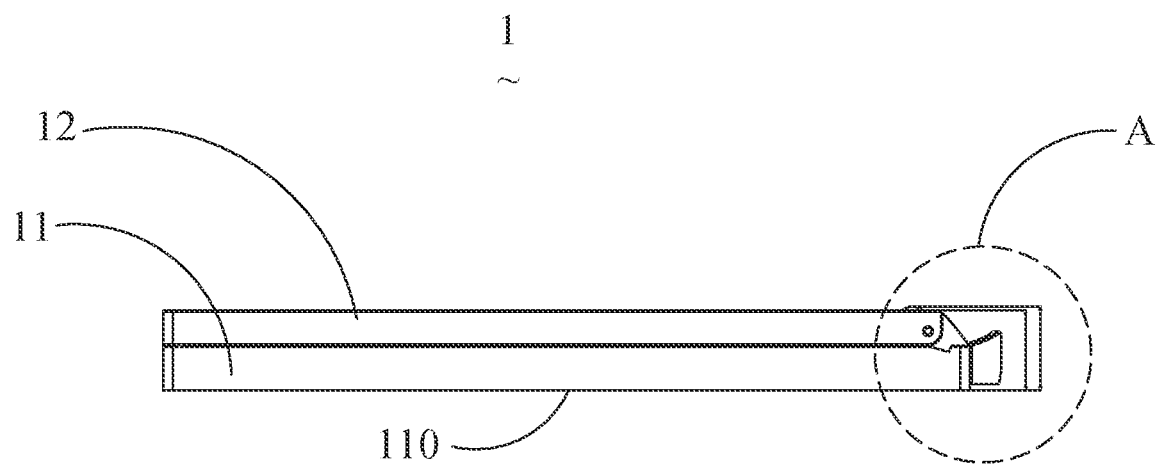
FIG. 13 is a side view of the film-sticking box according to some embodiments.
Figure 14:
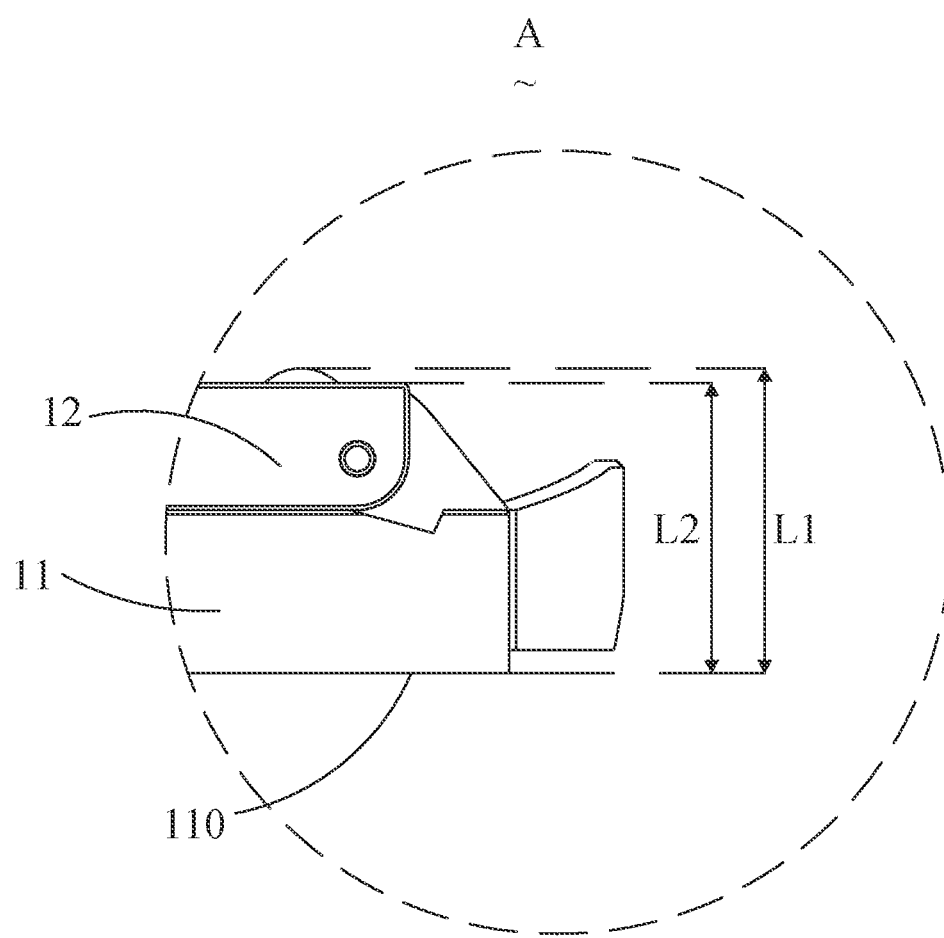
FIG. 14 is an enlarged view of part A in FIG. 13 according to some embodiments.

Referring to FIGS. 13-14, in order to reduce the thickness of the film-sticking assembly 1, the position where the pressing member 13 is located is the thickest part of the film-sticking assembly 1. L1 is greater than or equal to L2. L1 is the distance between the highest point of the pressing member 13 and the bottom of the base 11 when the upper cover 12 is covered on the base 11, i. e., the distance between the highest point of the pressing member 13 away from the base 11 and the bottom surface 110 of the base 11. L2 is the distance between the highest point of the upper cover 12 and the bottom surface 110 of the base 11 when the upper cover 12 is covered on the base 11, i. e., the distance between the side of the upper cover 12 away from the base 11 and the bottom surface 110 of the base 11. If L1 is greater than or equal to L2, the thickness of the thickest part of the film-sticking assembly 1 is L1, which greatly reduces the thickness of the film-sticking box 1. Compared with other film-sticking assemblies, the thickness of the upper cover 12 that accommodates the pressing member 13 is reduced to reduce the overall thickness of the film-sticking assembly 1, which is convenient for transportation and carrying.

Figure 15:
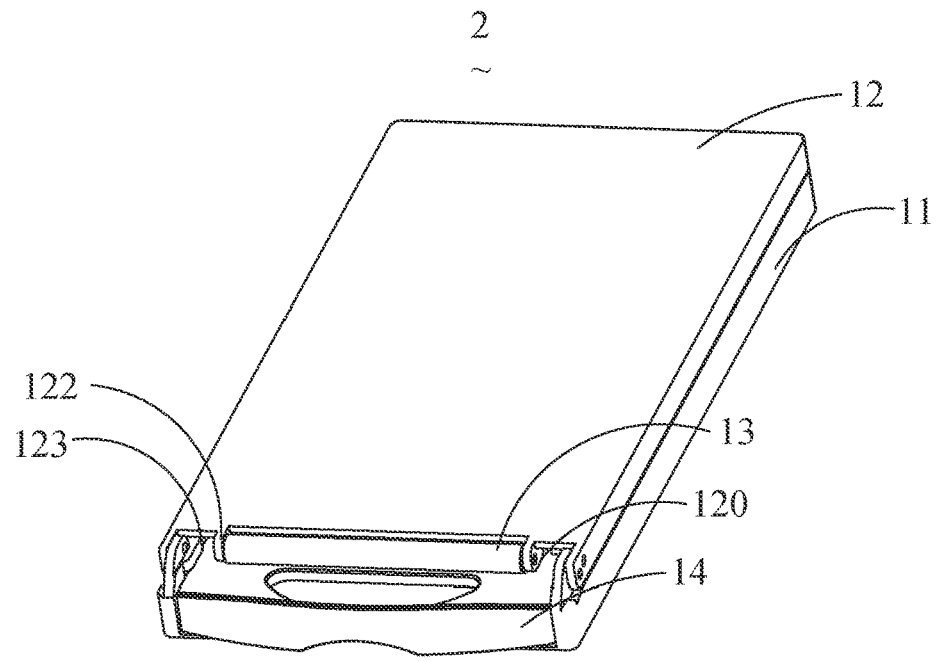
FIG. 15 is a perspective view of the film-sticking box according to some embodiments.

Referring to FIG. 15, a film-sticking assembly 2 is provided, according to certain embodiments. The film-sticking assembly 2 is different from the film-sticking assembly 1 in that the upper cover 12 directly acts on the pressing member 13, and the pressing member 13 is connected to the upper cover 12. Specifically, one end where the upper cover 12 is hinged to the base 11 may be provided with a clamping block 122. The clamping block 122 may be located in the notch 120. At least a portion of the pressing member 13 may pass through the clamping block 122. The clamping block 122 may fix the pressing member 13 on the upper cover 12, such that the upper cover 12 may directly fix the pressing member 13.

When the film-sticking box 2 is used for film sticking, the process thereof is as follows: the inner casing 14 is pulled out; the upper cover 12 and the inner casing 14 slide relatively; the pressing member 13 abuts the protective film 5; the protective film 5 moves along with the inner casing 14; the upper surface of the protective film 5 passes through the pressing piece 13 during the movement; the pressing member 13 continuously presses the protective film 5.

A gap 123, configured for the fixing structure 141 to pass through, may be formed between the clamping block 122 and the side wall of the notch 120. When the inner casing 14 is pulled, even if the fixing structure 141 is relatively high, the gap 123 may provide a passage for the fixing structure 141 to pass through, thereby ensuring that the pressing member 13 and the fixing structure 141 will not block each other to affect the use of the film-sticking box 1.

Figure 16:
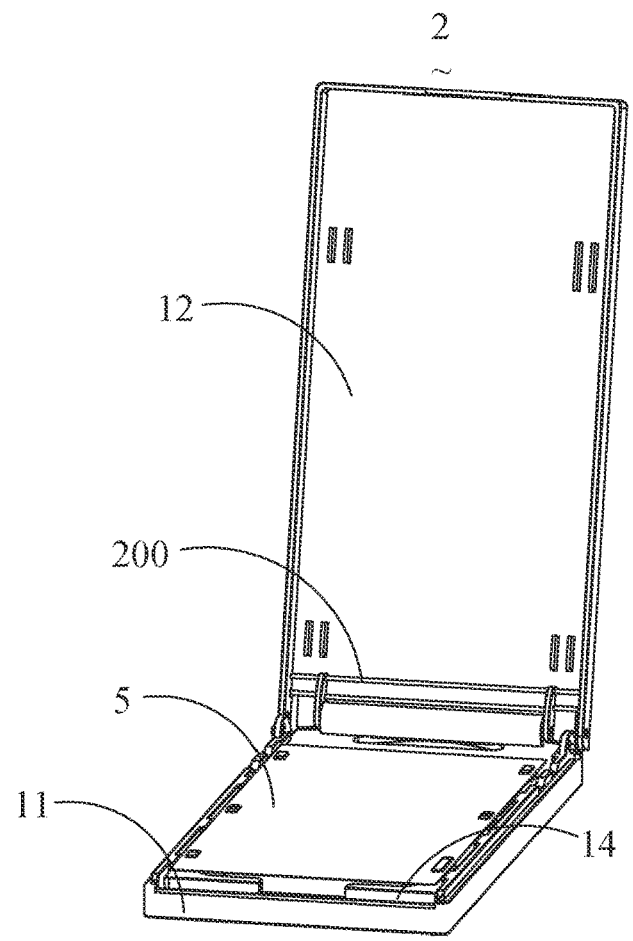
FIG. 16 is a perspective view of the film-sticking box in an open configuration according to some embodiments.

Referring to FIG. 16, further, in order to ensure that the pressing member 13 is fixed on the clamping block 122 of the upper cover 12 and that the upper cover 12 is not easy to deform such that the pressing member 13 will not be displaced when the inner casing 14 is pushed into or pulled out of the base 11, a strengthening structure 200 may be provided on the upper cover 12. The strengthening structure 200 may be a strengthening rib disposed on the upper cover 12 close to the clamping block 122, or may also be a thickened structure on the upper cover 12 close to the clamping block 122. By arranging the strengthening structure 200 at the place where the upper cover 12 is close to the clamping block 122, the structural stability of the place where the upper cover 12 directly acts on the pressing member 13 may be improved, the overall thickness of the upper cover 12 may be relatively thin, and the structure thereof will not be too complicated.

It can be understood that the above structure according to certain embodiments can also be combined with any of the above-mentioned embodiments, which is only an example and not a limitation of the present disclosure.

Figure 17:
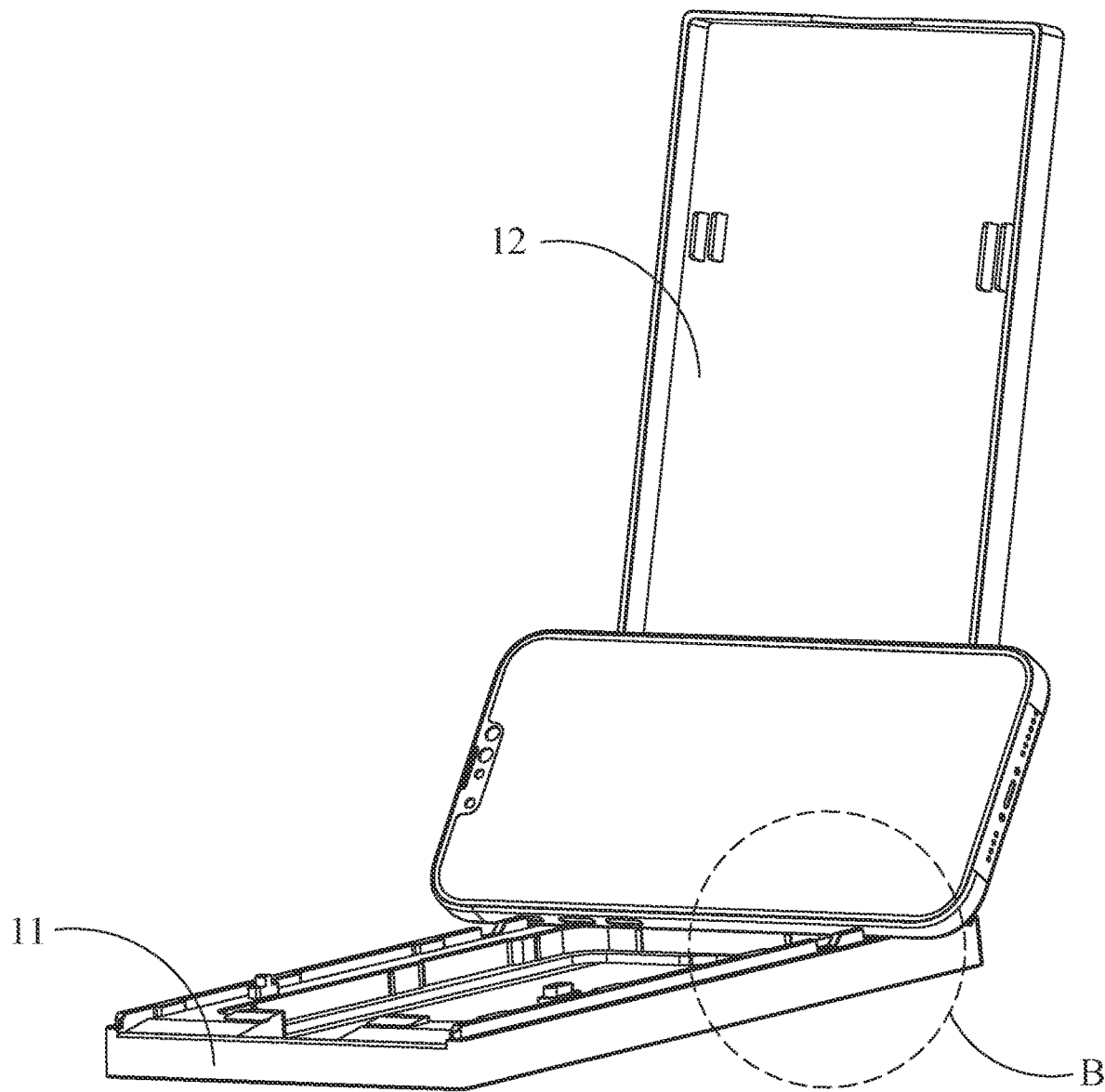
FIG. 17 is a perspective view of the film-sticking box with an electronic device supported thereon according to some embodiments.
Figure 18:
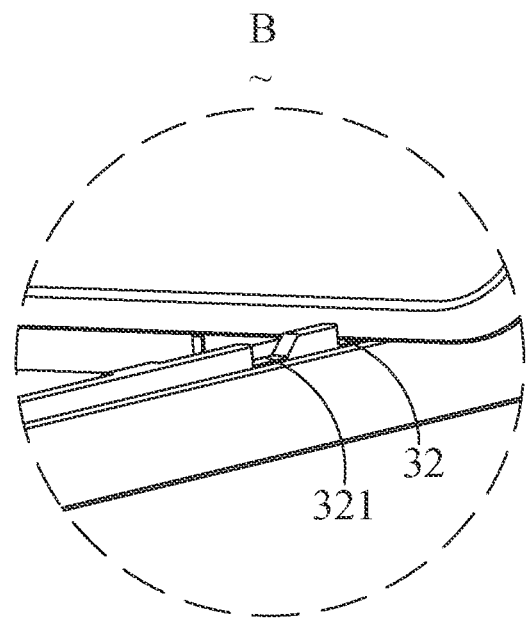
FIG. 18 is an enlarged view of part B in FIG. 17 according to some embodiments.
Figure 19:
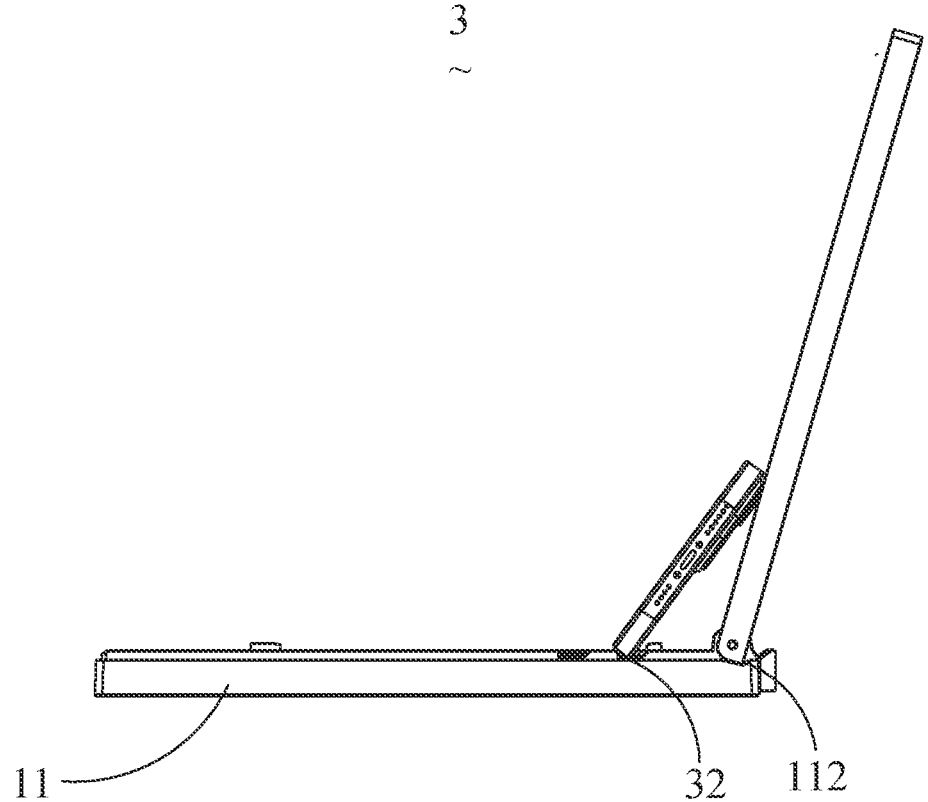
FIG. 19 is a side view of the film-sticking box with an electronic device supported thereon shown in FIG. 17 according to some embodiments.

Referring to FIGS. 17-19, a film-sticking assembly 3 is provided, according to certain embodiments. The film-sticking assembly 3 is different from the film-sticking assembly 1 in that one or more support structure 32 for fixing an electronic device is provided on the side wall of the base 11 facing the upper cover 12. The support structure 32 may include a support opening 321 formed on an edge of the base, or an anti-skid member disposed on an edge of the base, etc. For example, as shown in FIG. 17, the support structure 32 is configured as a support opening 321. During use, the electronic device may be snapped into the support opening 321, in which case the film-sticking box 3 may be used as a holder for the electronic device. It should be noted that the support openings 321 at different positions may be configured to place the electronic device at different angles to improve the practicability thereof.

As shown in FIG. 19, in some other embodiments, the base 11 is provided with a concave structure 112 disposed close to the position where the upper cover 12 is hinged to the base 11. When the upper cover 12 is opened, the concave structure 112 provides a rotatable space for the rotation of the upper cover 12 with respect to the base 11. When the upper cover 12 is in the maximum open state with respect to the base 11, the outer wall of the upper cover 12 abuts the inner wall of the concave structure 112, in which case the inner wall of the concave structure 112 may provide support for the upper cover 12.

It can be understood that the above structure according to certain embodiments can also be combined with any of the above-mentioned embodiments, which is only an example and not a limitation of the present disclosure.

Figure 20:
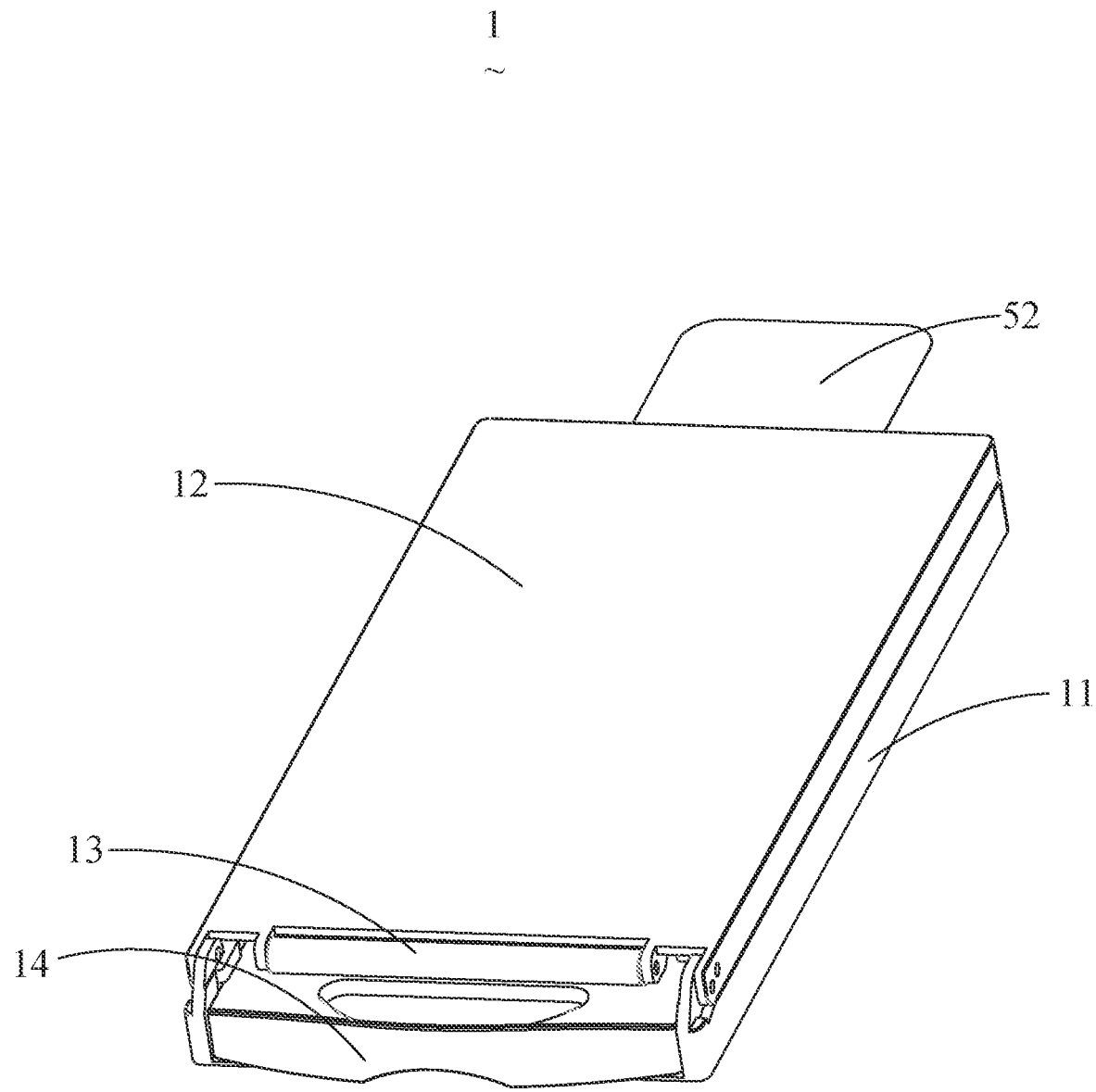
FIG. 20 is a perspective view of a film-sticking assembly according to some embodiments.
Figure 21:
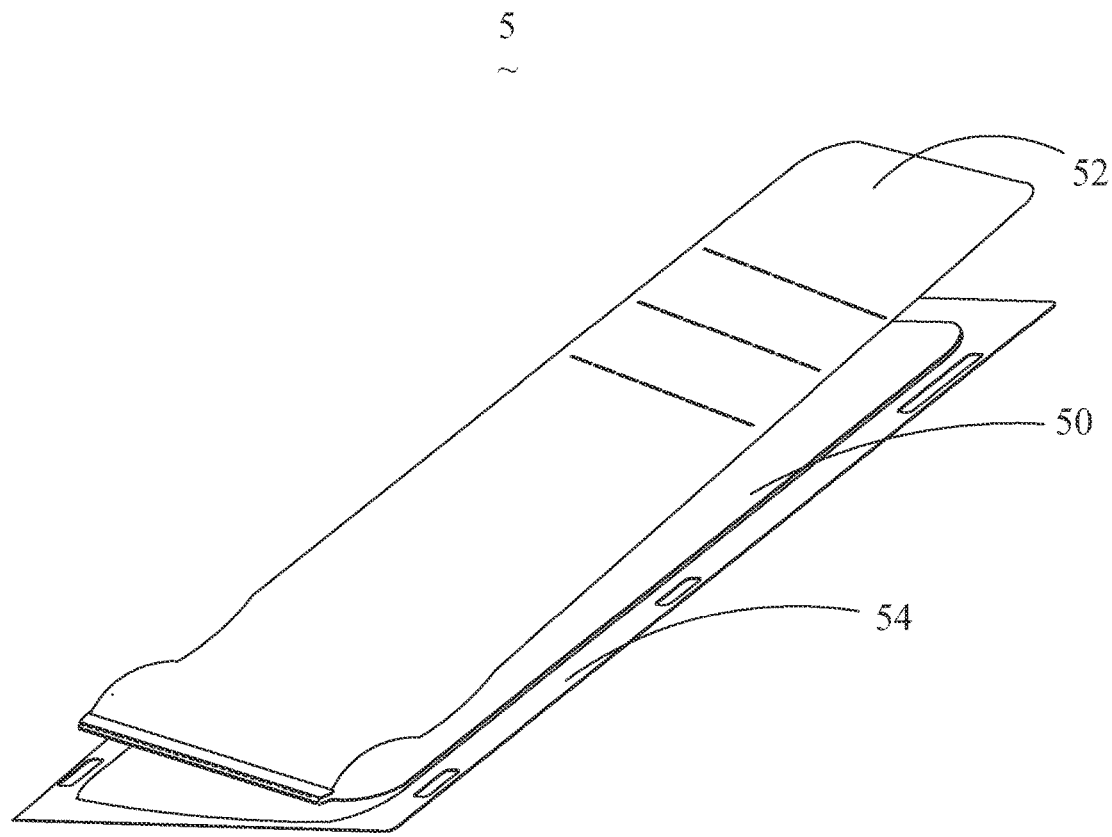
FIG. 21 is a structural schematic view of the protective film in a partially separated state according to some embodiments.

Referring to FIGS. 20-21, a film-sticking assembly is provided, according to certain embodiments. The film-sticking assembly includes a protective film 5 and the above film-sticking box. Taking the film-sticking box 1 as an example for illustration, the protective film 5 may be placed in the film-sticking box 1 to realize a dust-free drawing and sticking of the film. The upper cover 12 of the film-sticking box 1 covers the base 11 except for the notch 120 that exposes the pressing member 13.

Figure 22:
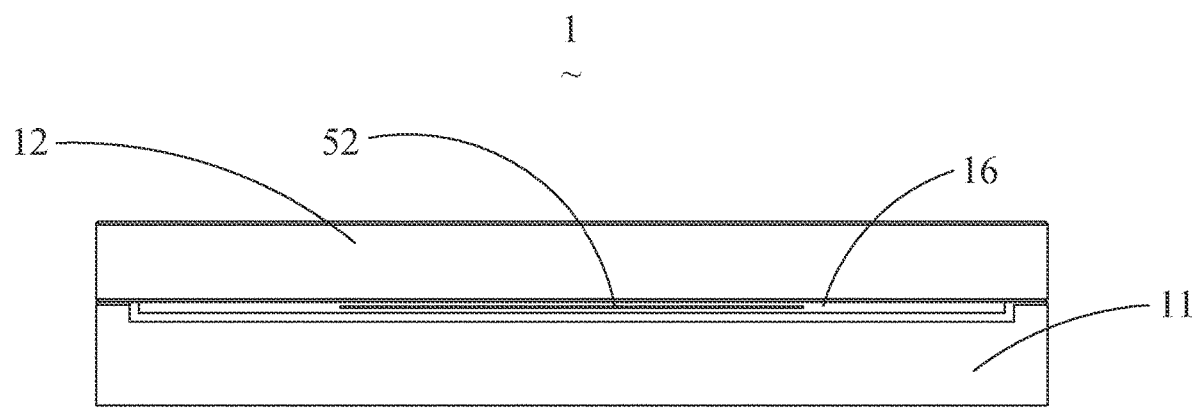
FIG. 22 is a side view of the film-sticking assembly according to some embodiments.

Referring to FIGS. 20-21, in one embodiment, the protective film 5 may include a film body 50, a release film 54 and a drawing part 52 connected to one end of the release film 54. The release film 54 is attached to one side of the film body 50, and the drawing part 52 is located on a side of the release film 54 away from the film body 50. As shown in FIG. 22, when the upper cover 12 is covered on the base 11, a slit 16 (i.e., the first opening 101) is defined between the base 11 and the end of the upper cover 12 away from the position where the upper cover 12 is hinged to the base 11, and the slit 16 may be configured for the protective film 5 to pass through the drawing part 52. The user may gradually separate the release film 54 from the lower portion of the film body 50 by pulling the drawing part 52 and then carrying out the following film sticking operations, which is convenient to use.

The protective film 5 may also include a dustproof film attached to the side of the film body 50 away from the release film, the dustproof film may be torn off after the film body 50 is attached to the electronic device.

The operation process of the film-sticking box 1 is as follows: first, opening the upper cover 12 from the base 11, placing the electronic device to be filmed into the inner casing 14, and installing the protective film 5 on the upper surface of the electronic device through the fixing structure 141 such that the release film 54 is close to the screen of the electronic device and the drawing part 52 extends via the slit 16; second, closing the upper cover 12 on the base 11, such that the upper cover 12 and the base 11 are in a closed state and the pressing member 13 abuts the protective film 5; third, pulling the drawing part 52 to separate the release film 54 from the film body 50, in which case the drawing part 52 and the release film 54 are pulled out via the slit 16 and the film body 50 is in contact with the screen of the electronic device; finally, pulling out the inner casing 14 that slides with respect to the upper cover 12, in which case the pressing member 13 abuts the protective film 5, the protective film 5 moves with the inner casing 14, and the upper surface of the protective film 5 passes through the pressing member 13 during movement, such that that the pressing member 13 may continuously squeeze the protective film 5 to complete the film sticking. If the protective film 5 does not have a drawing part, the operation process of the film-sticking box 1 is as follows: first, tearing off the release film 54, making the side of the film body 50 attached to the release film 54 close to the electronic device and fixing the film body 50 on the inner casing 14; second, gradually pulling out the inner casing 14, such that the inner casing 14 and the pressing member 13 move relatively and the pressing member 13 always abuts the surface to be filmed of the electronic device placed in the inner casing 14 to gradually attach the film body 50 to the surface of the electronic device to be filmed and gradually discharge the air bubbles; finally, when the inner casing 14 is pulled out to the preset position or completely pulled out, opening the upper cover 12 and tearing off the dustproof film located on the film body 50 to complete the film sticking.

In another manner of use, when the inner casing 14 is pulled out to a certain distance, pushing the inner casing 14 back into the base 11 with the electronic device that has been filmed to press the protective film that has been pasted onto the screen of the electronic device again to improve the film-sticking effect; after the inner casing 14 is pushed back to the initial position, opening the upper cover 12 and tearing off the dustproof film on the film body 50 to complete the film sticking.

In some other examples, whether the upper cover 12 is in an open or closed state, the film-sticking effect will not be affected.

In some other examples, the release film 54 of the protective film 5 may not be provided with a drawing part 52, and the film-sticking box 1 may not define a slit 16 for the drawing part to extend. In this case, the operation steps of film sticking are as follows:

First, placing the electronic device to be filmed in the accommodating groove 144 of the inner casing 14; second, tearing off the release film 54 on the protective film 5 and placing the protective film 5 without the release film 54 on the fixing structure 141 of the inner casing 14 to keep a certain distance between the lower surface of the protective film 5 and the surface of the electronic device to be filmed; third, closing the upper cover 12 on the base 11 and pulling the inner casing 14 to drive the electronic device and the protective film 5 to move with respect to the pressing member 13, such that the pressing member 13 gradually applies a downward force to the protective film 5 and the surface of the electronic device to make the film body 50 of the protective film 5 gradually attached to the surface of the electronic device and the air bubbles gradually discharged; finally, when the inner casing 14 is pulled out to the preset position or completely pulled out, opening the upper cover 12 and tearing off the dustproof film on the film body 50 to complete the film sticking.

In another manner of use, when the inner casing 14 is pulled out to a certain distance, pushing the inner casing 14 back into the base 11 with the electronic device that has been filmed to press the protective film that has been pasted onto the screen of the electronic device again to improve the film-sticking effect; after the inner casing 14 is pushed back to the initial position, opening the upper cover 12 and tearing off the dustproof film on the film body 50 to complete the film sticking.

The above descriptions are only preferred embodiments of the present disclosure, and are not intended to limit the present disclosure. Any modifications made within the principles of the present disclosure, equivalent replacements and improvements, etc. should be included within the protection scope of the present disclosure.

The invention claimed is:

1. A film-sticking box configured to attach a protective film to an electronic device, comprising:
   a main body; and
   an inner casing configured to accommodate the electronic device;
   wherein the main body defines a first opening and a second opening at two opposite ends of the main body;
   wherein the first opening is configured to pass the protective film therethrough, and the inner casing slides in or out via the second opening.

2. The film-sticking box of claim 1, wherein the main body comprises:

a base defining the second opening at one end thereof; and a pressing member disposed at the end of the main body close to the second opening;

wherein the inner casing moves with respect to the base, and the pressing member abuts a surface to be filmed of the electronic device accommodated in the inner casing.

3. The film-sticking box of claim 2, wherein the main body comprises an upper cover configured to cover the base, and the first opening, through which the protective film at least partially passes, is defined at one end of the base and/or one end of the upper cover away from the second opening.

4. The film-sticking box of claim 3, wherein a notch is defined at the upper cover close to the second opening, and the pressing member is disposed corresponding to the notch and exposed to the upper cover.

5. The film-sticking box of claim 1, wherein the pressing member is disposed on the base or the upper cover.

6. The film-sticking box of claim 2, wherein an orthographic projection of the pressing member on a bottom surface of the base does not overlap with the orthographic projection of the upper cover on the bottom surface of the base.

7. The film-sticking box of claim 3, wherein when the upper cover covers the base, a distance between one side of the pressing member away from the base and a bottom surface of the base is greater than or equal to a distance between one side of the upper cover away from the base and the bottom surface of the base.

8. The film-sticking box of claim 3, wherein one end of the upper cover is hinged to one end of the base, a convex edge is disposed at one end of the base where the upper cover is hinged thereto, an inner surface of the edge of the upper cover abuts an outer surface of the convex edge, and the pressing member is clamped with the convex edge.

9. The film-sticking box of claim 4, wherein the upper cover comprises a clamping block located in the notch, and the pressing member is connected to the upper cover via the clamping block.

10. The film-sticking box of claim 1, wherein an operating part is formed at the inner casing close to the second opening, and when the inner casing is located in the base, the operating part is at least partially exposed to the base, and
wherein the operating part comprises any one of a groove defined in an outer wall of the inner casing, a handle exposed to the base, and a hollow structure formed at one end of the inner casing close to the pressing member.

11. The film-sticking box of claim 1, wherein a plurality of fixing structures for fixing the protective film are provided at a top wall of the inner casing, and the plurality of fixing structures are disposed on the end of the inner casing close to the first opening and/or on two sides of the inner casing perpendicular to the end of the inner casing close to the first opening.

12. The film-sticking box of claim 1, wherein a plurality of resilient members are disposed on an inner wall of an accommodating slot defined by the inner casing, and the plurality of resilient members are integrally formed with or detachably connected to the inner casing.

13. The film-sticking box of claim 2, wherein the base is provided with a concave structure disposed close to a position where the upper cover is hinged to the base, and when the upper cover rotates to a preset angle with respect to the base, a portion of an outer wall of the upper cover abuts an inner wall of the concave structure.

14. The film-sticking box of claim 2, wherein a support structure is disposed at a side wall of the base facing the upper cover, and/or a strengthening structure is disposed at the upper cover close to the pressing member.

15. The film-sticking box of claim 2, wherein the base is provided with a plurality of fixing structures for fixing the protective film, a plurality of positioning grooves that correspond to the plurality of fixing structures are defined at one side of the upper cover facing the base, and when the upper cover covers the base, the plurality of fixing structures are at least partially located in the plurality of positioning grooves.

16. The film-sticking box of claim 2, wherein the pressing member has a roller structure, and an outer wall of the pressing member is made of a flexible material and/or the outer diameters of the middle portion and two ends of the pressing member are equal or unequal.

17. The film-sticking box of claim 2, wherein the inner casing is provided with a guiding bump and/or a guiding rib in a moving direction of the inner casing with respect to the base.

18. The film-sticking box of claim 17, wherein the inner casing defines an accommodating slot for accommodating the electronic device and a pickup slot communicated with the accommodating slot, and the pickup slot is defined between two sides of the guiding rib or the pickup slot is defined at the guiding bump.

19. A film-sticking assembly, comprising:
a protective film; and
the film-sticking box of claim 1;
wherein the protective film comprises a film body and a drawing film, and the film-sticking box comprises a main body and an inner casing;
wherein two openings are defined on the main body, the inner casing is at least partially moved out of the main body via one of the two openings along a second direction, and the other of the two openings is configured for the drawing film to pass through and be pulled along a first direction to separate the film body from the drawing film, wherein the first direction is opposite to the second direction.

20. The film-sticking assembly of claim 19, wherein the drawing film comprises a release film and a drawing part connected to one end of the release film, and wherein the release film is attached to one side of the film body, and the drawing part is located at a side of the release film away from the film body.

* * * * *